(12) United States Patent
Edwards et al.

(10) Patent No.: US 6,616,080 B1
(45) Date of Patent: Sep. 9, 2003

(54) RETRACTABLE CORD DEVICE

(75) Inventors: Bruce Philip Edwards, Menlo Park, CA (US); Craig M. Janik, Los Altos Hills, CA (US); Andrew Ivan Poutiatine, Palo Alto, CA (US)

(73) Assignee: Speculative Product Design, Inc., Palo Alto, CA (US)

( * ) Notice: Subject to any disclaimer, the term of this patent is extended or adjusted under 35 U.S.C. 154(b) by 0 days.

(21) Appl. No.: 09/560,631

(22) Filed: Apr. 28, 2000

Related U.S. Application Data

(60) Provisional application No. 60/131,914, filed on Apr. 30, 1999, and provisional application No. 60/131,444, filed on Apr. 28, 1999.

(51) Int. Cl.$^7$ ............................................. B65H 75/48
(52) U.S. Cl. .................. 242/378.1; 242/378.2; 242/385.4; 191/12.2 R
(58) Field of Search .............. 242/378.1, 378.2, 242/385.4; 191/12.2 R, 12.4

(56) References Cited

U.S. PATENT DOCUMENTS

| | | |
|---|---|---|
| 1,247,672 A | 11/1917 | Hallberg |
| 1,276,825 A | 8/1918 | Swope |
| 1,442,999 A | 1/1923 | Boyle |
| 1,446,410 A | 2/1923 | Bennett et al. |
| 1,737,978 A | 12/1929 | Sebell |
| 1,958,626 A | 5/1934 | Krantz |
| 2,031,434 A | 2/1936 | Stern et al. |
| 2,206,352 A | 7/1940 | Hellmann |
| 2,211,561 A | 8/1940 | Flannelly |
| 2,262,587 A | 11/1941 | Kaempt |
| 2,521,226 A | 9/1950 | Keller |
| 2,678,779 A | 5/1954 | Bellmer |
| 2,979,576 A | 4/1961 | Huber |
| 3,061,234 A | 10/1962 | Morey |
| 3,372,887 A * | 3/1968 | Ladany .................. 242/378.1 |
| 3,584,157 A | 6/1971 | Prescott |
| 3,657,491 A | 4/1972 | Ryder et al. |
| 3,798,389 A | 3/1974 | Tokizaki |
| 3,984,645 A | 10/1976 | Kresch |
| 4,053,118 A | 10/1977 | Aikins |
| 4,062,608 A | 12/1977 | Pierce |
| 4,081,153 A | 3/1978 | Tanaka et al. |
| 4,384,688 A | 5/1983 | Smith |
| 4,386,744 A | 6/1983 | Higbee |
| 4,472,010 A | 9/1984 | Parnello |
| 4,517,757 A | 5/1985 | Asada et al. |
| 4,646,987 A | 3/1987 | Peterson |
| 4,691,383 A | 9/1987 | DeMars |
| 4,757,955 A | 7/1988 | Simmons |
| 4,813,627 A | 3/1989 | Nelson |
| 4,940,859 A | 7/1990 | Peterson |
| 4,940,955 A | 7/1990 | Peterson |
| 4,942,617 A | 7/1990 | Boylan |
| 4,989,805 A | 2/1991 | Burke |
| 5,074,863 A | 12/1991 | Dines |
| 5,094,396 A | 3/1992 | Burke |
| 5,104,056 A | 4/1992 | Jannotta et al. |
| 5,109,412 A | 4/1992 | Hollowed et al. |

(List continued on next page.)

Primary Examiner—John Q. Nguyen
(74) Attorney, Agent, or Firm—Gray Cary Ware & Freidenrich LLP

(57) ABSTRACT

A retractable device is provided for an earphone/microphone used with a cell phone. The device is formed of a housing with one rewinding spool for the earphone end of the cord with allowance for twisting of the connector end of the cord. The device with two spools allows for independent rewinding of earphone end portion of the cord and the connector end portion of the cord on different spools and the confinement of a middle portion of the cord in reversible winding cavity with the ends of the middle portion of the cord fixed so that middle portion can wind and rewind in the reversible winding cavity without leaving the cavity.

3 Claims, 48 Drawing Sheets

U.S. PATENT DOCUMENTS

| | | |
|---|---|---|
| 5,124,685 A | 6/1992 | Rankin |
| 5,128,993 A | 7/1992 | Skowronski |
| 5,155,766 A | 10/1992 | Skowronski |
| 5,156,242 A | 10/1992 | Ditzig |
| 5,289,987 A | 3/1994 | Collins et al. |
| 5,339,461 A | 8/1994 | Luplow |
| 5,400,521 A | 3/1995 | Waldherr |
| 5,410,597 A | 4/1995 | Kepley, III et al. |
| 5,422,957 A | 6/1995 | Cummins |
| 5,511,120 A | 4/1996 | Hirata et al. |
| 5,520,350 A | 5/1996 | Doty et al. |
| 5,535,960 A | 7/1996 | Skowronski et al. |
| 5,581,821 A | 12/1996 | Nakano |
| 5,590,749 A | 1/1997 | Wagner et al. |
| 5,684,883 A | 11/1997 | Chen |
| 5,832,098 A | 11/1998 | Chen |
| 5,920,997 A | 7/1999 | Girtman |
| 6,019,304 A | 2/2000 | Skowronski et al. |
| 6,095,075 A | 8/2000 | Gordon et al. |

* cited by examiner

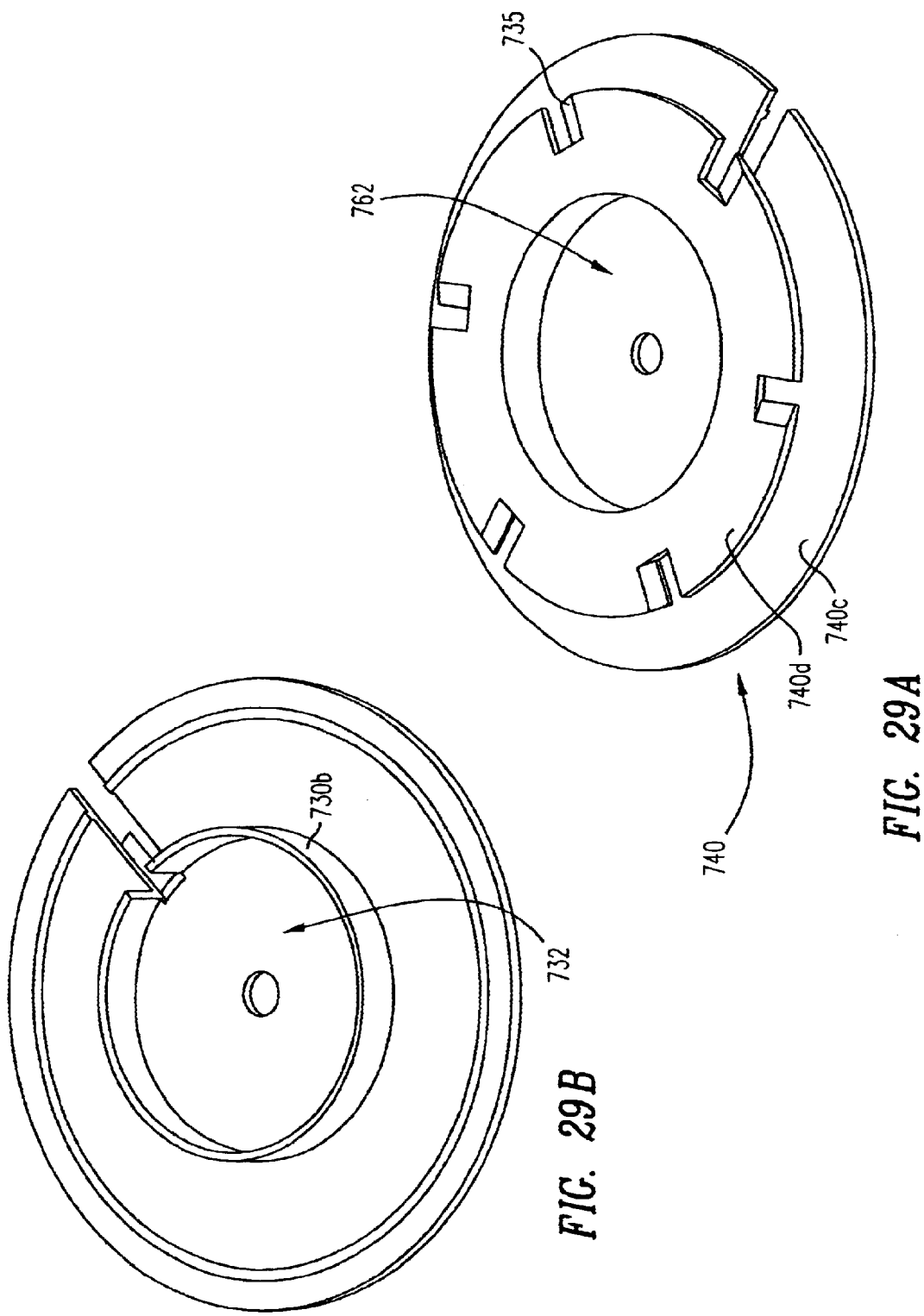

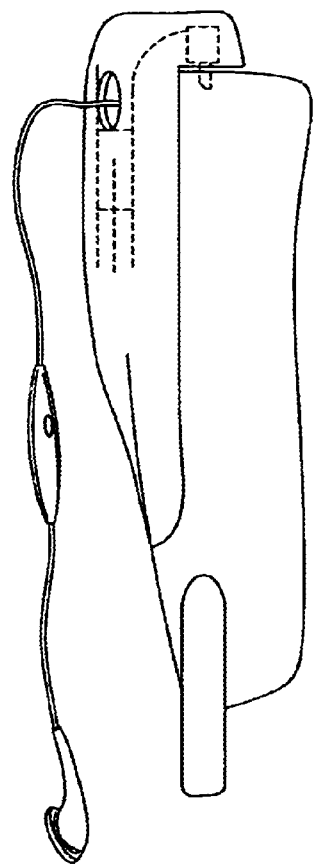
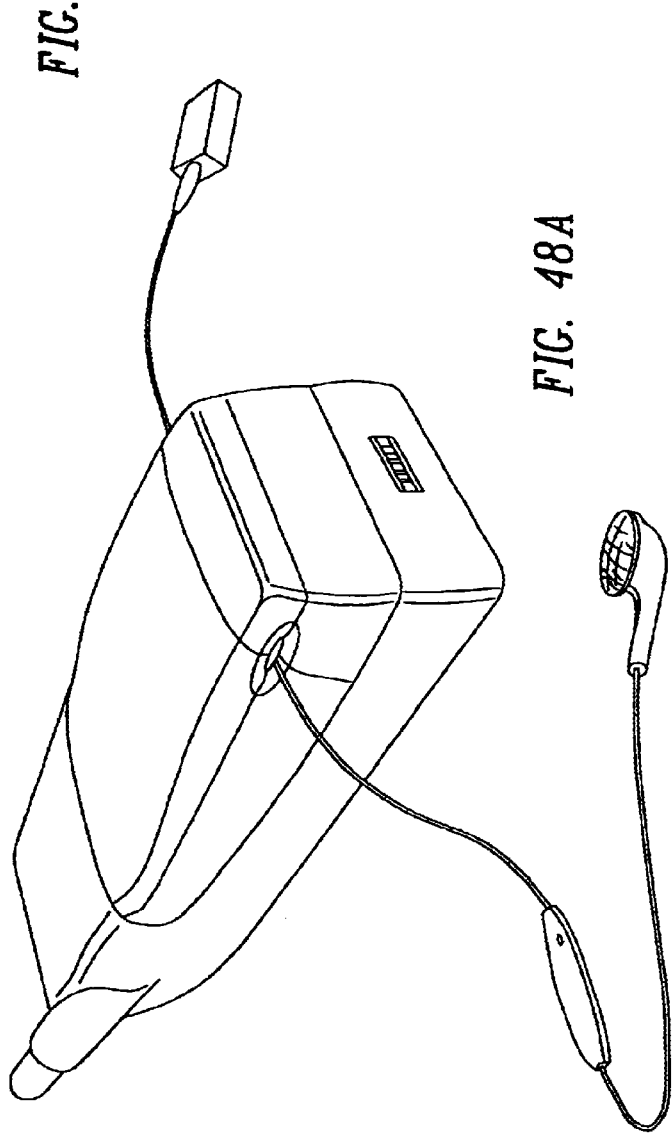
FIG. 48B
FIG. 48A

RETRACTABLE CORD DEVICE

This application claims benefit of provisional No. 60/131,444 filed Apr. 28, 1999 and claims benefit of No. 60/131,914 filed Apr. 30, 1999.

BACKGROUND OF THE INVENTION

The present invention relates generally to retractable cord devices and more particularly to retractable earphone devices for cellular phones.

With the advent of cellular phones the use of an earphone, typically in conjunction with a microphone connected to the cell phone, has been very common so that the user can operate the phone hands free such as when driving, etc.

Several earphone retraction devices have been marketed. Many of these devices include an earphone/microphone line and a separate line with a connector that connects to the cell phone. Some of these devices only provide retraction of the earphone/microphone cord length and not the connector cord length. Additionally, many of these devices twist the earphone cord during extraction and retrieval that complicates operation of the device. U.S. Pat. No. 5,684,883 discloses one retraction device.

SUMMARY OF THE INVENTION

Broadly stated, the present invention is directed to a retractable device that will automatically retract and store a cable or cord such as a headphone. Specifically, this device allows for extraction and retraction of a one-piece continuous electrical cord, without twisting the cord. One end of the cord may be fixed and the other extracted and retracted or, both ends may be extracted and retracted independently and/or simultaneously.

A retractable device in accordance with the present invention includes a circular housing, a continuous cord with a first earphone end portion, a second connector end portion, and a middle portion. At least a first winding spool is provided within the housing for winding the first end portion of the cord, a spiral spring urging the spool to wind the earphone end portion of the cord in a peripheral cavity of the spool with means for fixing the middle portion of the cord in the housing and openings for both the earphone cord and the connector cord.

In accordance with the board aspect of the present invention, the retractable device can eliminate twisting of the earphone cord and appropriate regions are provided for allowing twisting of the connector cord.

In accordance with the preferred embodiment of the present invention, the retracting device includes a reversible winding cavity located in the housing and rotatable about the housing axis for housing the middle portion of the cord. Means are provided for fixing the opposite ends of the middle portion of the cord at two points within the housing so that the middle portion can be rotated in opposite directions within the reversible cavity responsive to rotation of the spools without the middle portion of the cord leaving the reversible winding cavity for avoiding twisting of the cord.

Other aspects of the present invention are the inclusion of means for separately engaging the spools for the earphone cord and the connector cord for retrieval of both end portions of the cord into the housing.

The present invention can operate two spools for retracting the opposite ends of the cord using one or two springs.

The invention also includes the incorporation of the retracting mechanism into a telephone cradle, a belt clip, and/or a cellular battery.

These features and advantages of the present invention will become more apparent upon a perusal of the following specification taken in conjunction with the accompanying drawings.

DESCRIPTION OF THE DRAWINGS

FIGS. 29A and 29B are perspective top and bottom views, respectively, of the top spool in the embodiment illustrated in FIGS. 25–27.

FIGS. 48A and 48B illustrate how the retractable cable device can be integrated into a cellular phone battery.

DESCRIPTION OF THE EMBODIMENTS

Figure 1A:
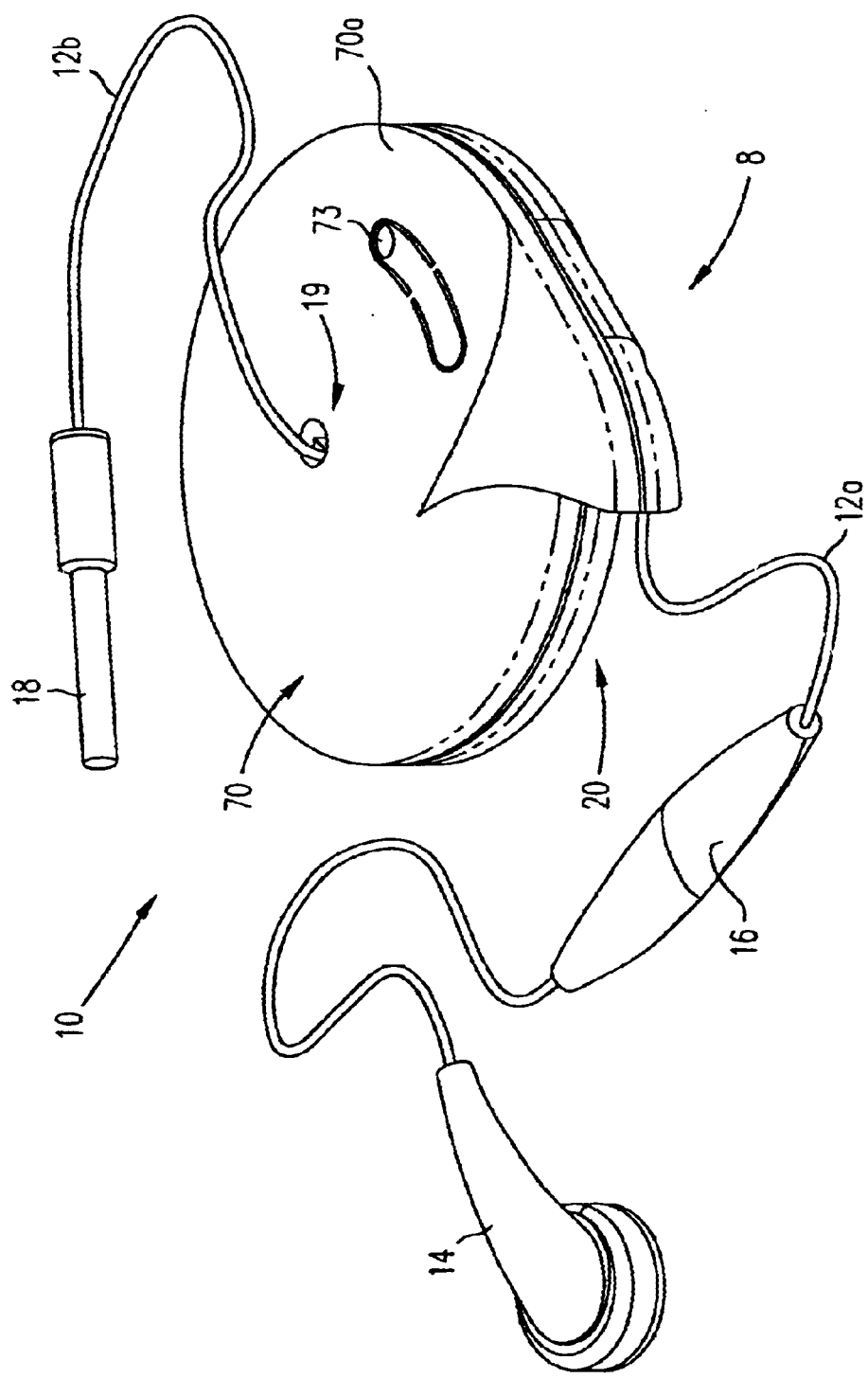
FIGS. 1A and 1B are top and bottom isometric views respectively of a retractable headphone device according to the present invention.
Figure 1B:
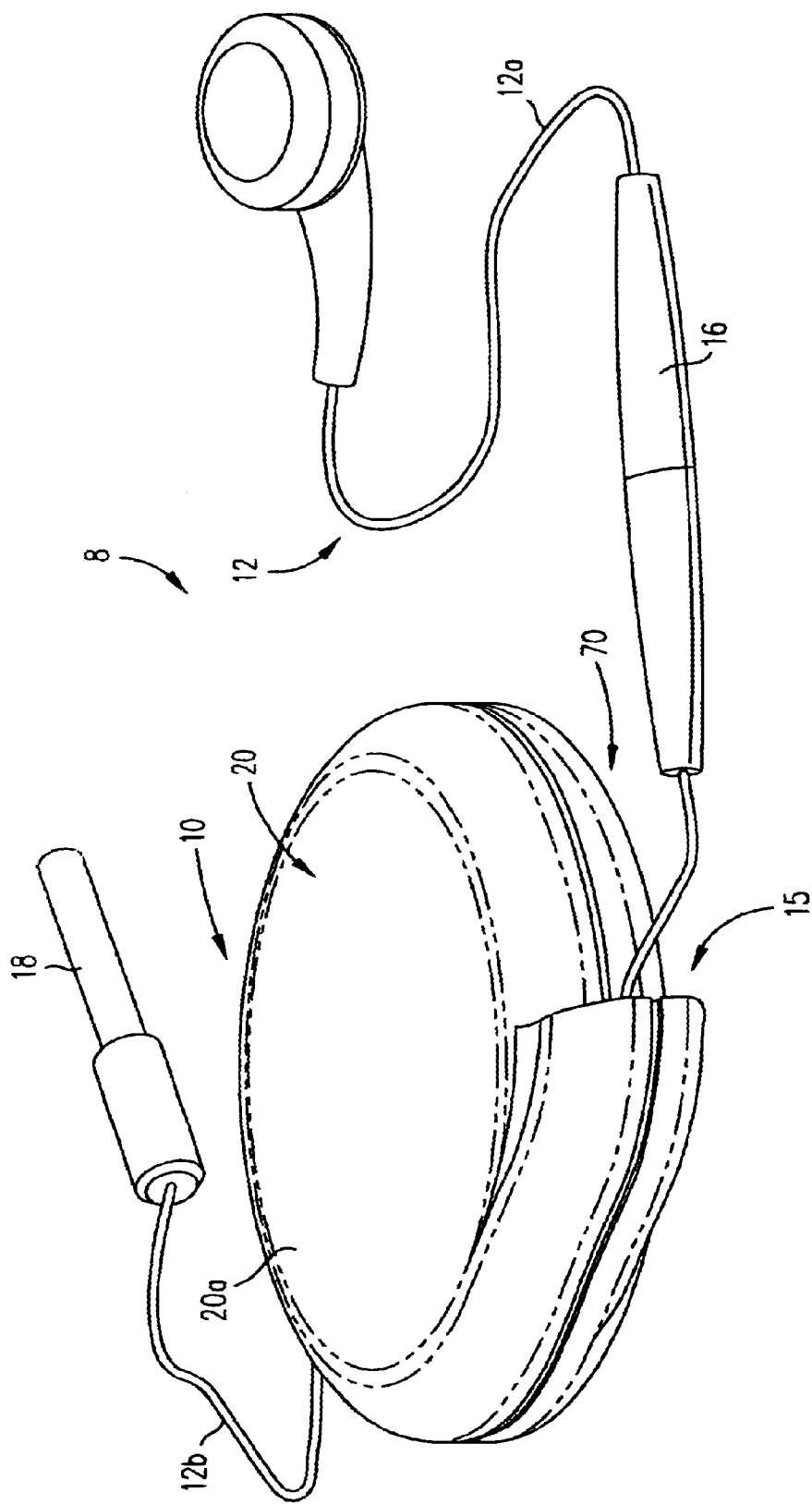
Figure 2:
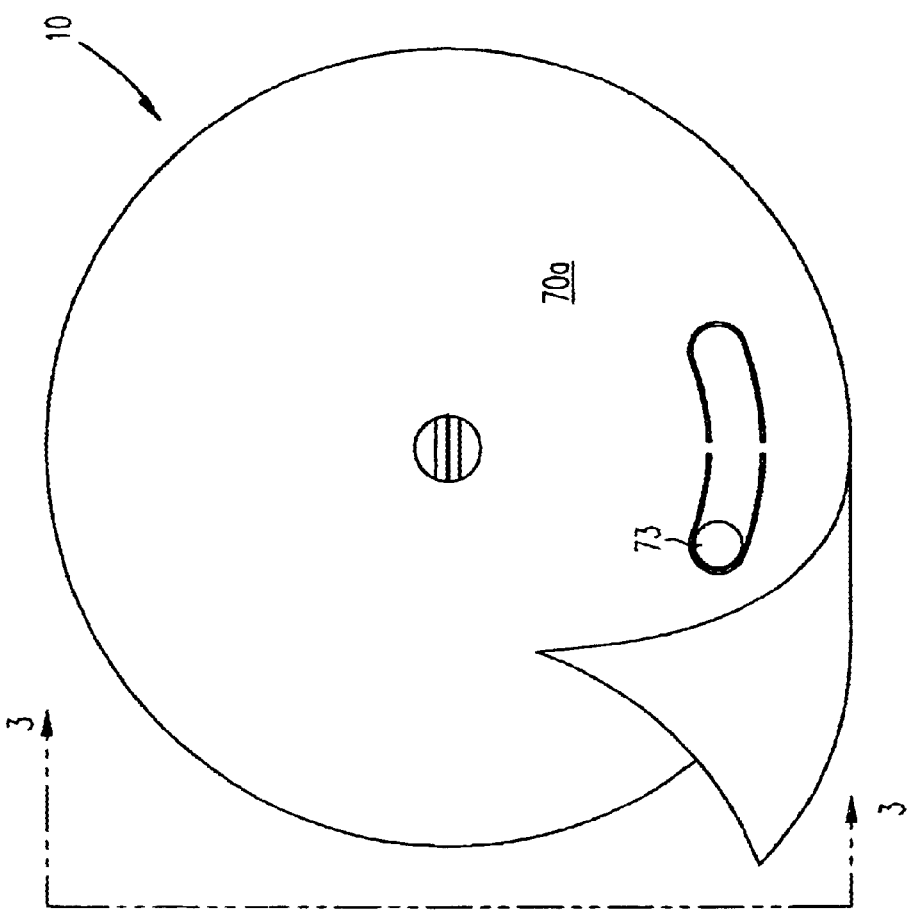
FIG. 2 is a top plane view of the retractable cord device of FIG. 1.
Figure 3:
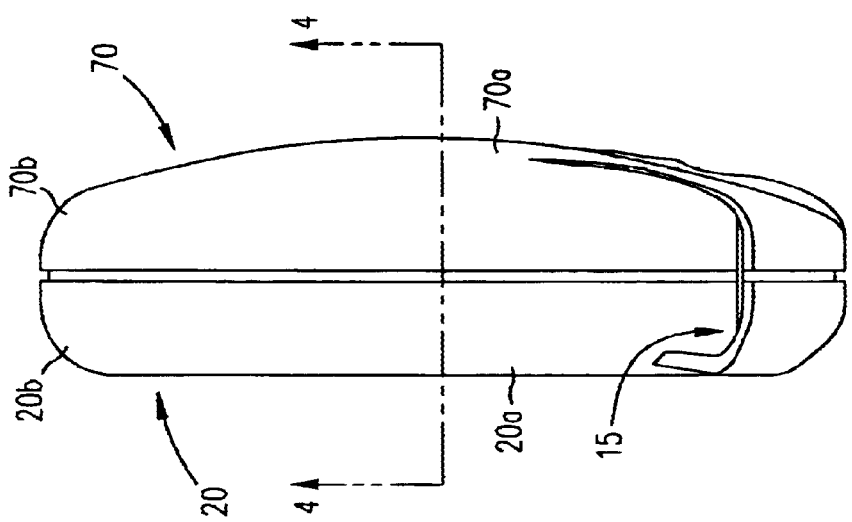
FIG. 3 is a side elevational view of the structure shown in FIG. 2 taken along line 3—3 in the direction of the arrows.

The invention in all of the illustrated embodiments is directed to a retractable cord device 8 having a continuous cellular earphone/microphone wire or cord 12 which can be retractably contained within a housing 10.

The first embodiment shown in FIGS. 1–7 illustrates a single spool single spring retractable cord device in which the connector end portion 12*b*, which has a connector element 18, extends through the middle of the top of the device.

Referring now to FIGS. 1–6, the retractable cord device 8 includes a continuous cord that extends through the retractable housing 10 and has appropriate phone communication components at opposite ends thereof. The cord 12 is typically composed of several conductors, for the earphone and so on, covered by the required insulation layers. At an earphone end portion 12*a* of the cord an earphone 14 is connected and includes a speaker. A microphone module 16 is located a short distance along the cord earphone end portion 12*a* from the earphone 14. At the other end portion 12*b* of the cord 12, a connector 18 is provided for connection to a particular mating connector on a cell phone. Each manufacturer's earphone/microphone cord connector may be different. It should be noted that the earphone cord 12 is a continuous cord from the microphone module 16 to the connector 18; that is, there are no breaks or discontinuities in the cord or wires that make up the cord. In this description, fastening details such as screws, screw bosses or ultra-sonic welding details, have been omitted so as not to obscure the invention. Components and fastening methods such as these are well known in the field of accessory design and would be obvious to a designer skilled in the art. Obviously, the housing and spool components shown in this disclosure would be injection-molded plastic.

Figure 4:
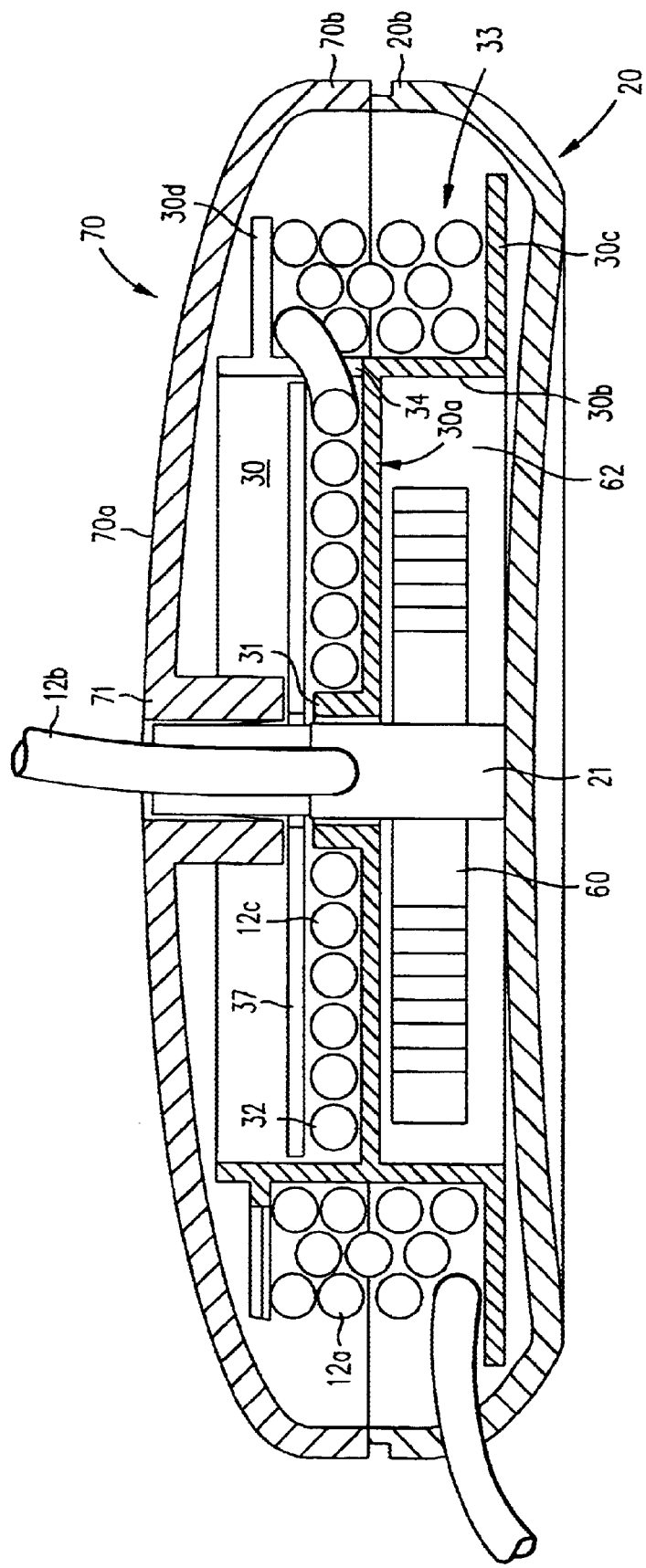
FIG. 4 is a cross sectional view of the structure of the first embodiment taken along line 4—4 in the direction of the arrows in FIG. 3.

Referring now more specifically to FIGS. 4–6, the housing 10 is made up of a bottom shell 20 which has a flat or inwardly concave bottom surface 20*a* with an integral peripheral flange portion 20*b* which are connected to a similar size top shell 70 which has a circular domed-surface 70*a* integrally connected to a circular peripheral flanged portion 70*b* which mates with the flanged portion 20*b* of the bottom shell 20. The bottom shell includes a central spindle 21 that projects toward the top shell 70 and engages a journal 71 on the inside surface of the top 70*a*, the bore of journal 71 extending to an opening 19 in the top surface 70*a* of the top shell. The central spindle 21 has a lower narrow slot 21*a* at its lower end and a wider upper slot 21*b* which extends to the free end of the spindle which seats in the journal 71 of the top shell.

A cord spool 30 which is positioned within the bottom shell 20 has a central flat wall 30*a* extending from an aperture and an upwardly projecting hub 31 radially outward to a cord cavity wall 30*b* perpendicular to the flat wall 30*a* which cavity wall 30*b* includes an outwardly extending lower annular flange 30*c* and an upper annular flange 30*d*. The cavity wall 30*b* and peripheral flanges 30*c* and 30*d* define an outwardly opening earphone cord-winding cavity 33. The upper annual flange 30*d* includes a series of spool stop slots 35, which engage a spool stop, described below.

Below the central flat wall 30*a* of the spool 30 and radially inward from the cavity wall 30*b* is a spring cavity 62 which houses a spiral spring 60. The central or inner end 60*a* of the spring is attached to the spindle 21 integral to the bottom shell 20. The spring 60 is attached by inserting the bent end of the spring 60 into the narrow slot 21*a* in the base of the spindle 21. The outer end 60*b* of the spring is attached to the inside wall of the spool in the spool cavity 62. Thus, if the spool is rotated in the direction of the arrow, shown in FIG. 5A, the energy of rotation will be stored in the spring and can be used to rotatably return the spool to its original unwound state. It should be noted that some pre-load would be added to the system so that when the cord is wound in the winding cavity as described below, the spring will still be wound slightly. This provides a small retraction force that would be maintained on the cord 12 when it can no longer be pulled into the housing, say, by the fact that the microphone 16 is located in the earphone end orifice 15.

Figure 5A:
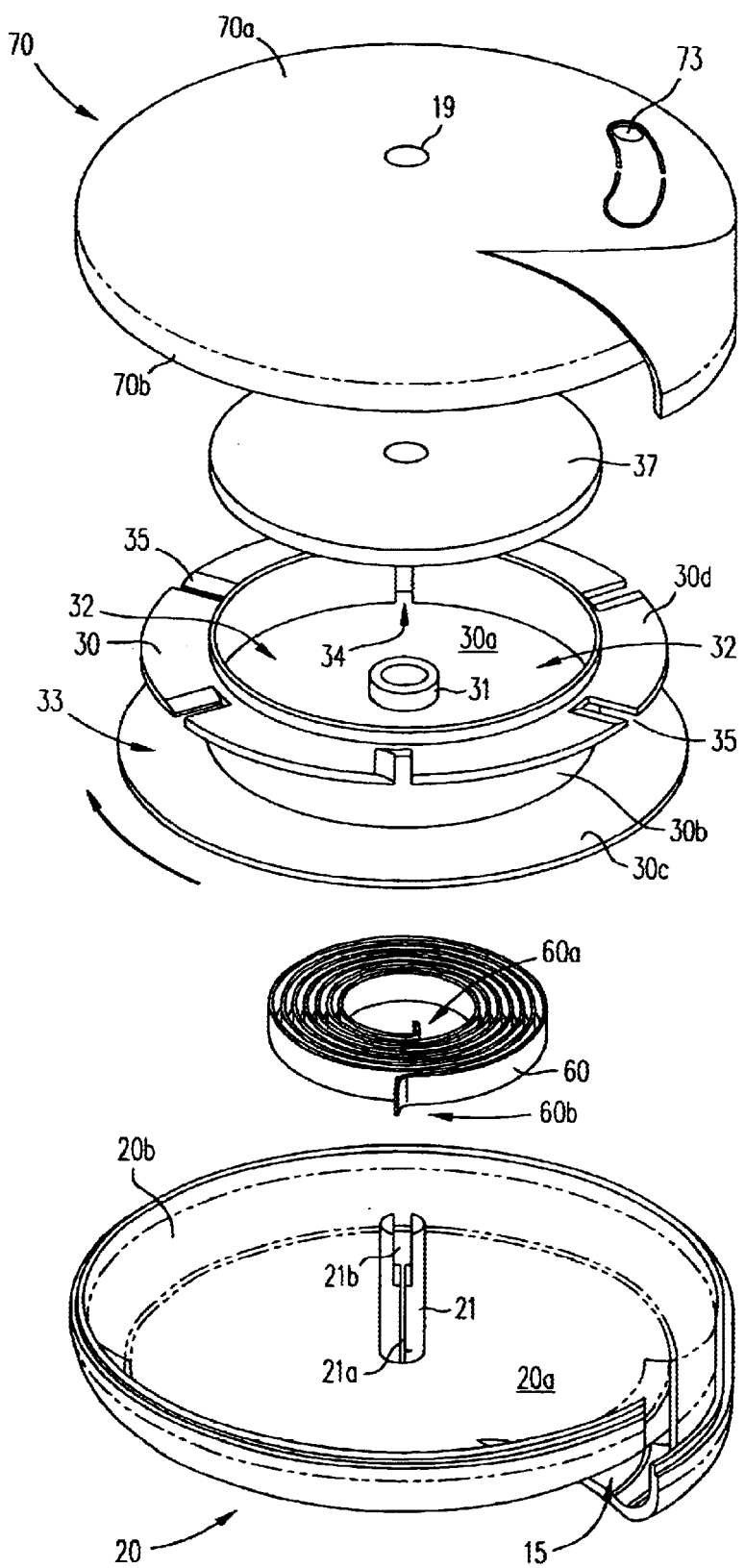
FIG. 5A is an exploded view of the first embodiment of the invention.
Figure 5B:
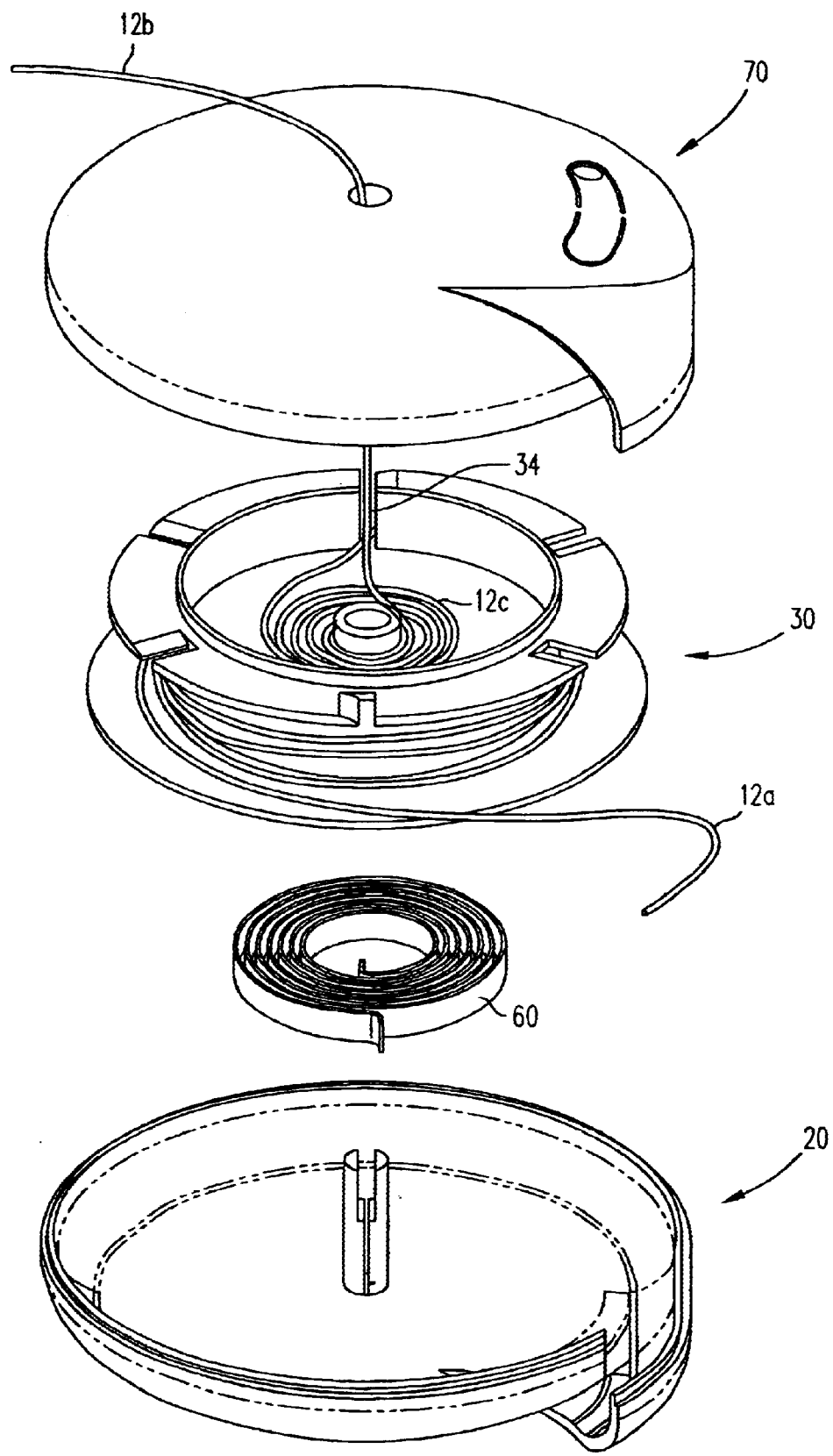
FIG. 5B is a view similar to FIG. 5A showing the inclusion of the cord.
Figure 6B:
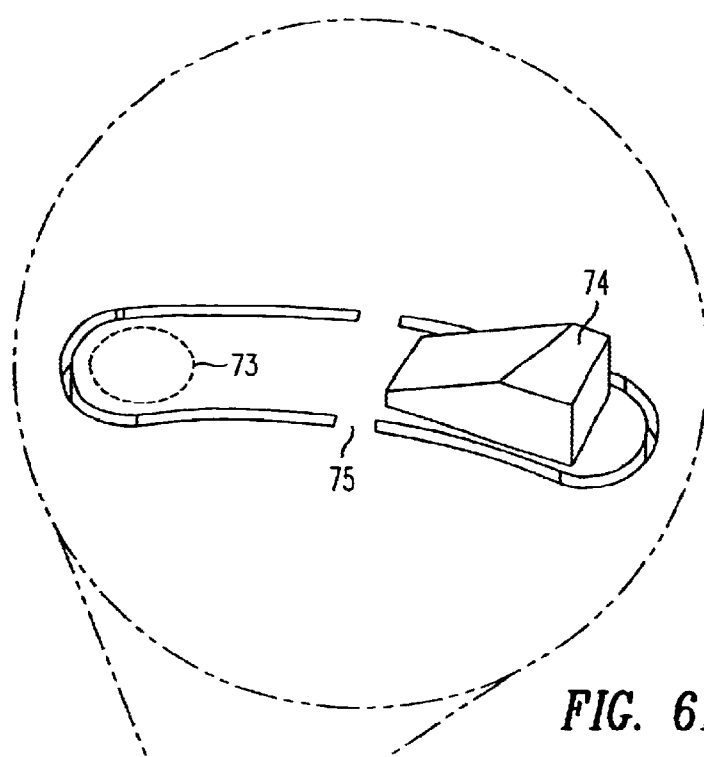
FIG. 6B is an enlarged plane view of a portion of the structure shown in FIG. 6A designated by line 6B—6B.
Figure 6A:
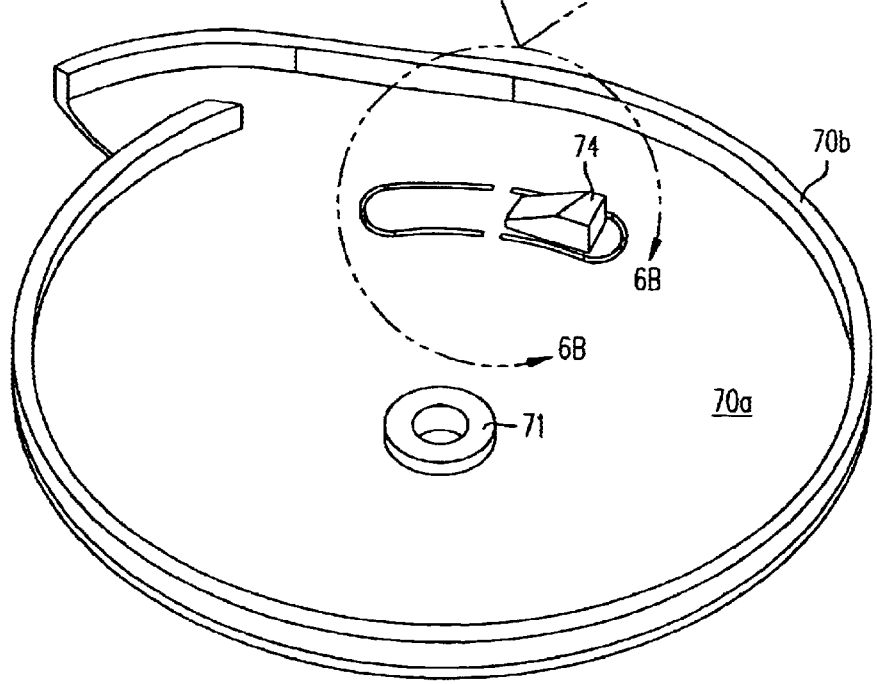
FIG. 6A is a perspective view of the underside of the top shell of the device shown in FIGS. 1–5.

FIG. 5B shows the routing of the earphone cord 12 through the mechanism. Frown the connector 18 end the cord 12 enters the top of the housing through a circular opening 19. Here the cord 12 enters the wide slotted portion 21b of the spindle 21. This section of cord 12 is fixed at that point, that is, this section of the cord cannot be pulled through the spindle slot or the top shell 70. The second end of the middle portion 12c of the cord 12 is tightly fixed where it leaves the reversible winding cavity 32 through cord slot 34. The middle portion 12c of the cord is wound spirally in one plane in the reversible winding cavity 32 and is held wound in this single plane by the reversible winding constraint plate shown in FIG. 5A but not shown in FIG. 5B for clarity. As stated above, the first end of the middle portion 12c of the cord 12 then exits the reversible winding cavity 32 through cord slot 34 and enters the main spool area. The second end of the middle portion 12c of the cord 12 is fixed in the cord slot 34; that is, the cord cannot slide back and forth through this slot. A fixed length middle portion 12c of the cord is thus spirally wound and contained in the reversible winding cavity. Passing through cord slot 34, the cord then winds around the cavity wall 30b of the spool 30 in the earphone cord-winding cavity 32 constrained by the flanges 30c and 30d.

In the retracted state, the majority of the length of the earphone wire 12 is wound up and contained inside the retractable earphone housing 10. The microphone 16 may or may not be retracted inside the housing 10, depending upon the design of the earphone end orifice 15. The spring 60 is at its most unwound state, although it is still pre-wound to provide some additional retraction load in this state.

To use the earphone 14, the earphone 14 attached to the earphone end portion 12a of the cord 12 is pulled away from the housing 10. This action rotates the spool relative to the top and bottom shells 20 and 70 and winds the spring 60. This action also begins to unwind the spirally wound middle portion 12c of the cord 12 in the reversible winding cavity 32. The direction of the spirally wound portion 12c in the reversible winding cavity 32 is such that as the earphone end of the cord is pulled out, the spiral untightens. That is, the rotation causes the spiral to rotate in the direction opposite the spiral. Thus, the coils of the cord begin to spread out radially from the spindle 21, in the reversible winding cavity 32. At a certain point, the part of the cord 12c that is fixed to the spindle 21 reverses the direction of the spiral winding, and the middle portion 12c of the cord 12 in the reversible winding cavity 32 begins to wind up in the opposite direction. This action is shown in a series of frames in FIG. 7.

Figure 7:
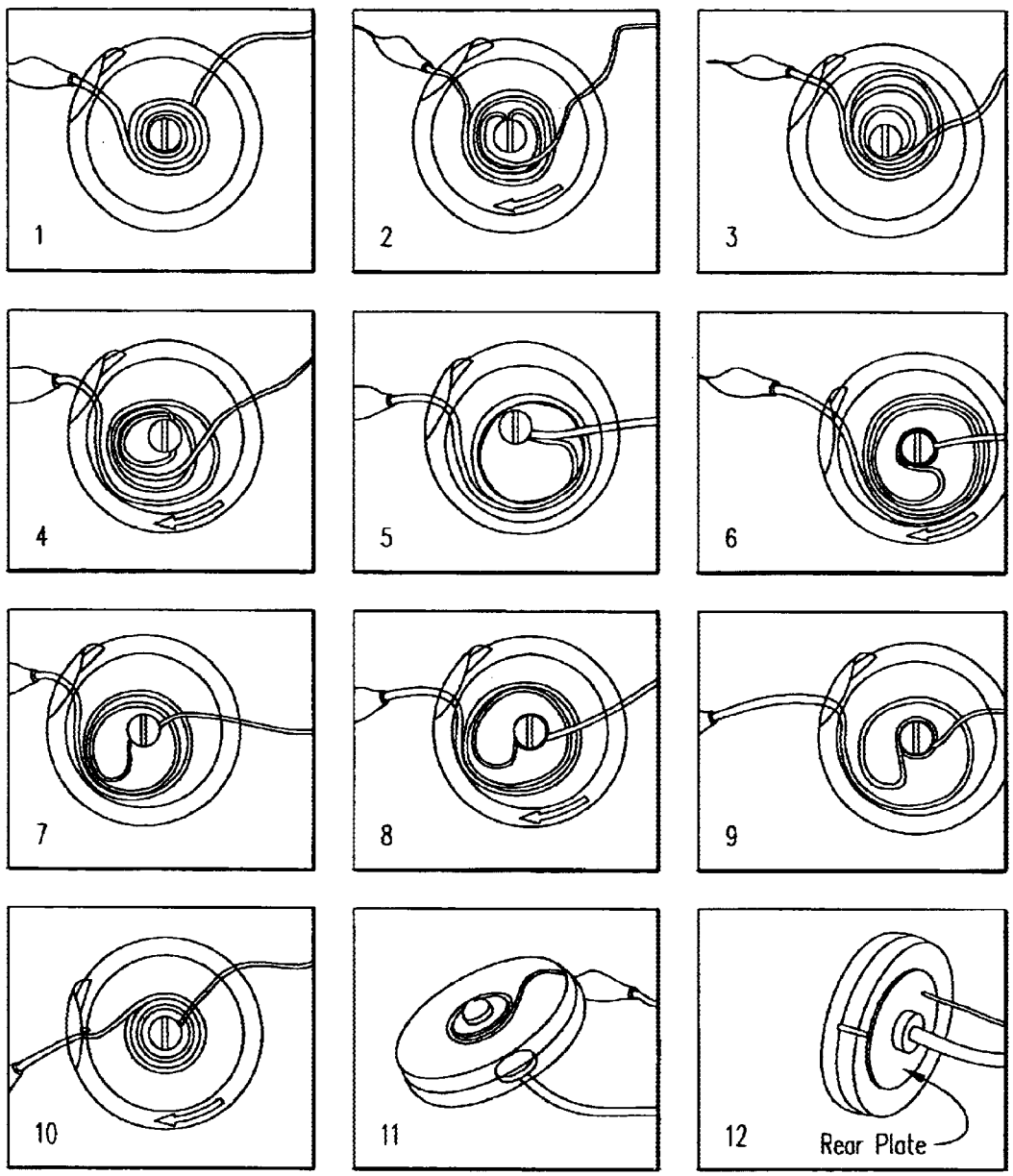
FIG. 7 shows a series of frames illustrating the action of the cord in the reversible winding cavity of the device shown in FIGS. 1–6.

FIG. 7 shows a model of this mechanism with a transparent housing. In the model the one end of the middle portion 12c of the cord is fixed at the slot in the spool (on the left side). The second end of the middle portion 12c is fixed at the spindle 21, which in the model is the screw body rotatable with respect to the spool 30. In frame 2, the spindle has rotated 180° clockwise relative to the spool 30. Frames 3, 4 and 5 show the spindle 30 continuing to rotate clockwise. It can be seen that the spiral wound middle portion 12c of the cord is loosening, the spirals are growing larger in radius and moving away from the center. Frames 5 and 6 show the moment when the second end of the middle portion 12c of the cord that is fixedly attached at the spindle change the direction of curvature. The middle portion 12c of the cord begins to rewind, with the part of the cord that is still in the old spiral direction having its spiral direction changed at the "S" curve. Finally, in frame 10, which is many more rotations than frame 9, the middle portion 12c of the cord has completely rewound but in the reverse direction of spiral. However, the spindle has only rotated in the clockwise direction in frames 1–10. In this way, a single continuous cord can be used in a system that takes up a long length of cord, without the cord twisting torsionally, and with one end fixed.

The other two frames 11 and 12 which are respectively an isometric view and a rear isometric view, are included to show the model in more detail. Depending upon the number of revolutions required to take up all of the length of a certain earphone cord, the mechanism disclosed here could function only rotating between the state of frame 1 and any of the other subsequent frames. For example, if half of the number of rotations were required, the spiral winding in the reversible winding cavity 33 need not reverse upon itself. In other words, half of the rotations would be used between frame 1 and frame 5. Again, a single continuous cord 12 can be used in a system that takes up a long length of cord 12, without the cord 12 twisting torsionally, and with one end fixed. It should be noted that in the prototype model shown in frames 1–12, the rear plate in the rear isometric view of frame 12 is fixed to the spindle (screw body) and rotates with the shaft. This design could work well with the rear plate fixed with respect to the outer housing so that the rear plate does not rotate. Likewise, the reversible winding constraint plate 37 could also be fixed with respect to the rotation or it could rotate. All of the disclosures in this document that utilize a reversible winding chamber design to eliminate the twist on the cord rely on the principal disclosed in FIG. 7.

The device in the embodiment of FIGS. 1–7 also contains a design for a latch mechanism. This design is included in all of the other embodiments of this disclosure unless an alternative latch mechanism is described. Referring now to FIGS. 5A, 6A and 6B, the latch flexure is shown. FIG. 5A shows the top shell 70 from the top outside view. FIGS. 6A and 6B show the underside of the top shell 70. There is a spool stop protrusion 74 on the side of the latch flexure 75 opposite the side that has the latch button 73 on the other side. When the latch button 73 is not being pressed the spool stop 74 extends into the space that is occupied by the top outer flange surface 30d of the spool, the surface containing the spool stop slots 35. When the spool 30 rotates so that the spool stop 74 can extend down into the spool stop slot 35, the spool 30 is prohibited from rotating. The latch button 73 is a domed shaped feature that protrudes above the domed top 70a of the top shell 70. This protrusion allows the user to push the latch button 73 side of the flexure 75 down into the domed top surface 70a of the top shell 70. The thin flexure area 75 that connects the latch flexure 73 to the main part of the top shell domed top 70a are loaded when the button is pressed, resulting in a torsional strain. This rotates the spool stop side of the latch flexure out of the space of the spool stop slot 35, and the spool is free to rotate. Each spool stop slot 35 includes an angled lead-in at one edge. Thus, when the cord 12 is being extracted, the spool stop 74 will flex down into the spool stop slot 35 space but will ride up the angled edge, allowing the spool 30 to be rotated. This provides a one-way ratchet function. When the cord is finished being extracted, the spring 60 will attempt to retract the spool 30, but the spool 30 will only retract back a partial rotation until the spool stop 74 flexes down into the next spool stop slot 35. The spool is thus prohibited from retracting until the flexure is depressed.

The hollow cylindrical space above the spool central flat wall 30a and inside the cavity wall 30b forms a reversible winding cavity 32 for the middle section of the cord 12 described below. The cavity wall 30b includes a slot 34 for passage of the cord 12 from the earphone cord winding cavity 33 at the periphery of the spool 30 and connection of one end of the middle portion 12c of cord 12 to the spool 30.

It should be noted that any of the embodiments disclosed here could be used for both cellular phone earphones, as shown in many of the embodiments, or the design could be used with audio headphones. The cellular phone earphone has at least one speaker and an in-line microphone. Audio headphones would not have a microphone.

An alternative second embodiment of the present invention is illustrated in FIGS. 8–11. This embodiment is similar in many respects to the embodiment of FIGS. 1–7. The second embodiment differs from the first embodiment in that the spring is above the spool there is no reversible winding cavity; and a phone-type plug is built into and projects out of the device at the connector end of the cord. The elements of the second embodiment similar to corresponding elements in the first embodiment are designated with similar reference numbers but with an additional initial digit "1."

Figure 8:
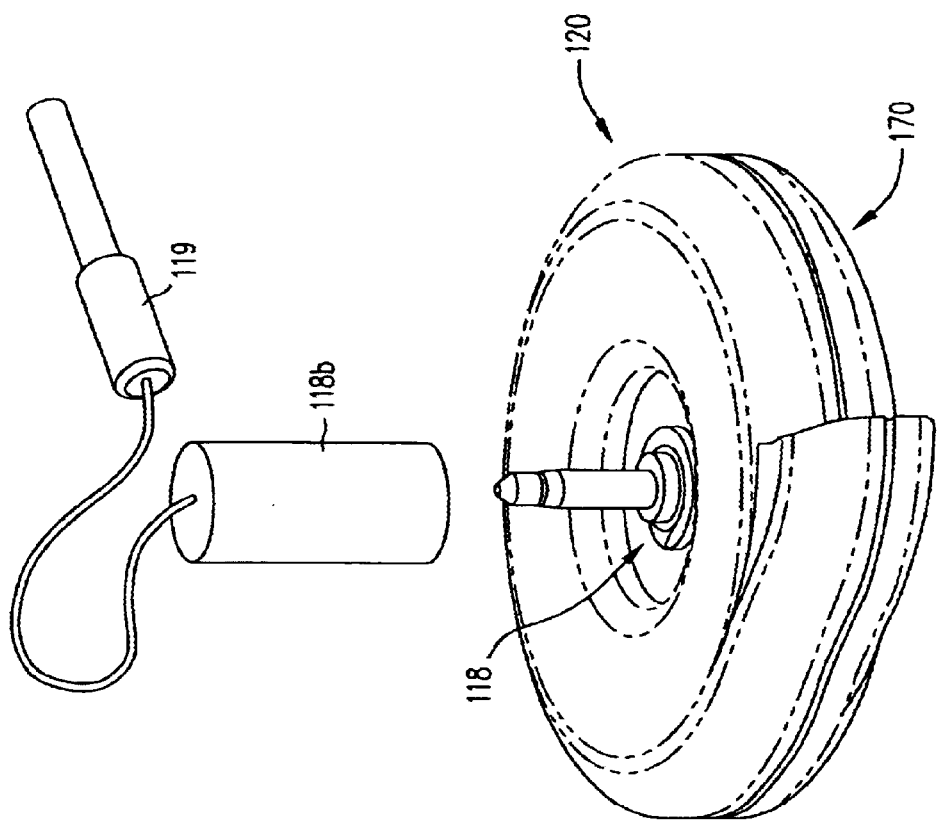
FIG. 8 is a bottom perspective view similar to FIG. 1B of an alternative second embodiment of the present invention.
Figure 9:
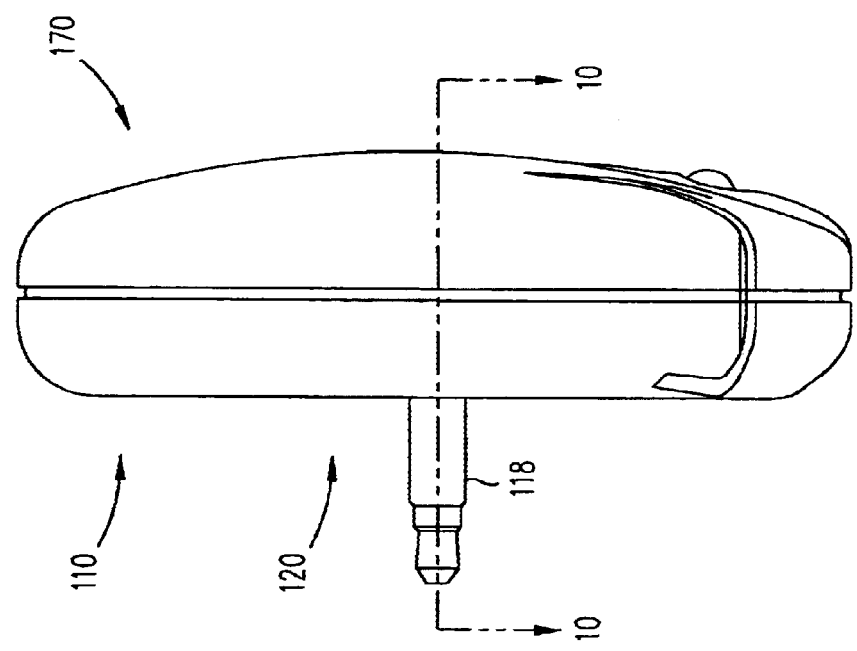
FIG. 9 is a side view of the alternative second embodiment of the present invention similar to FIG. 3.
Figure 10:
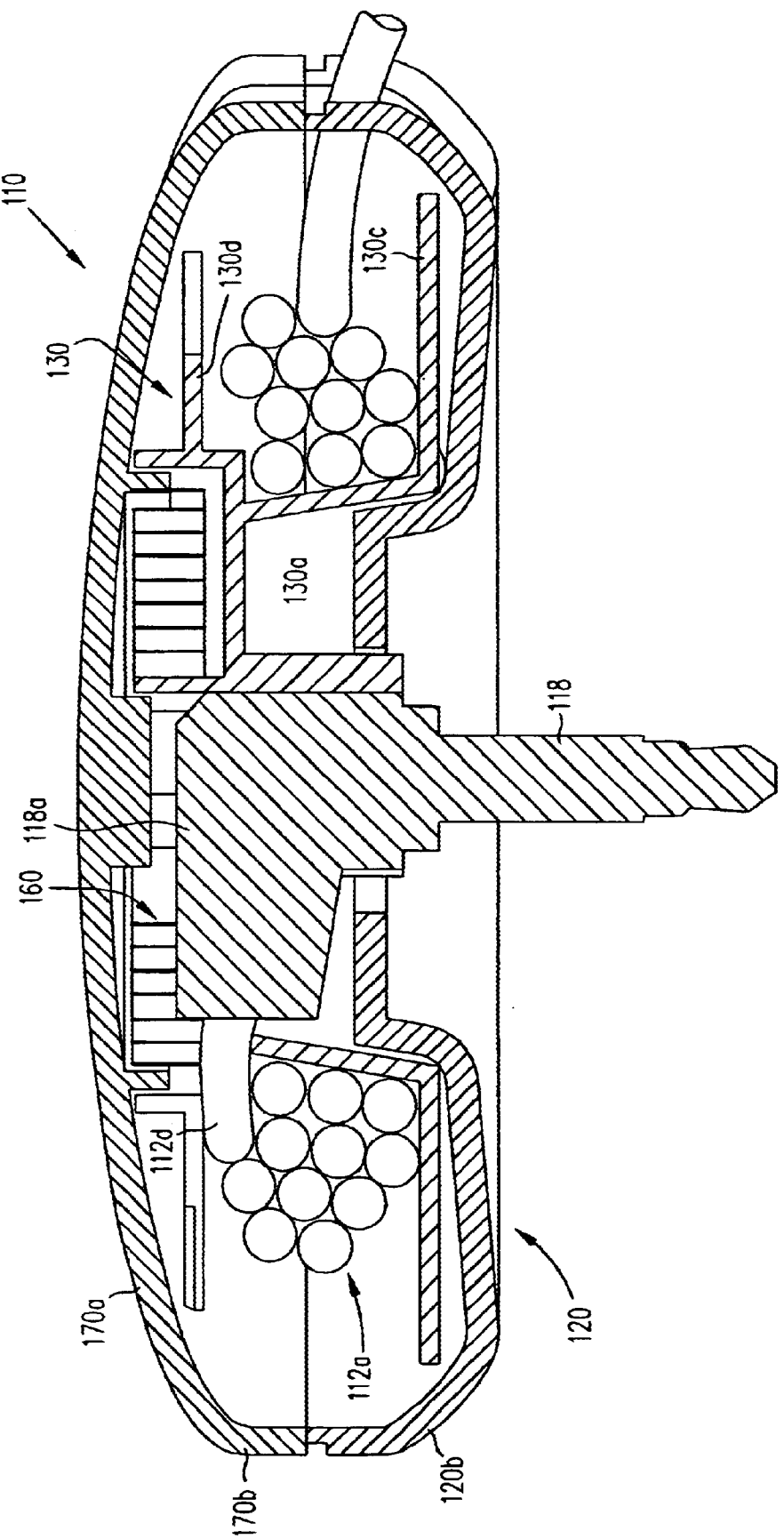
FIG. 10 is a cross sectional view of the structure shown in FIG. 9 taken along line 10—10 in the direction of the arrows showing the alternative second embodiment of the present invention.
Figure 11:
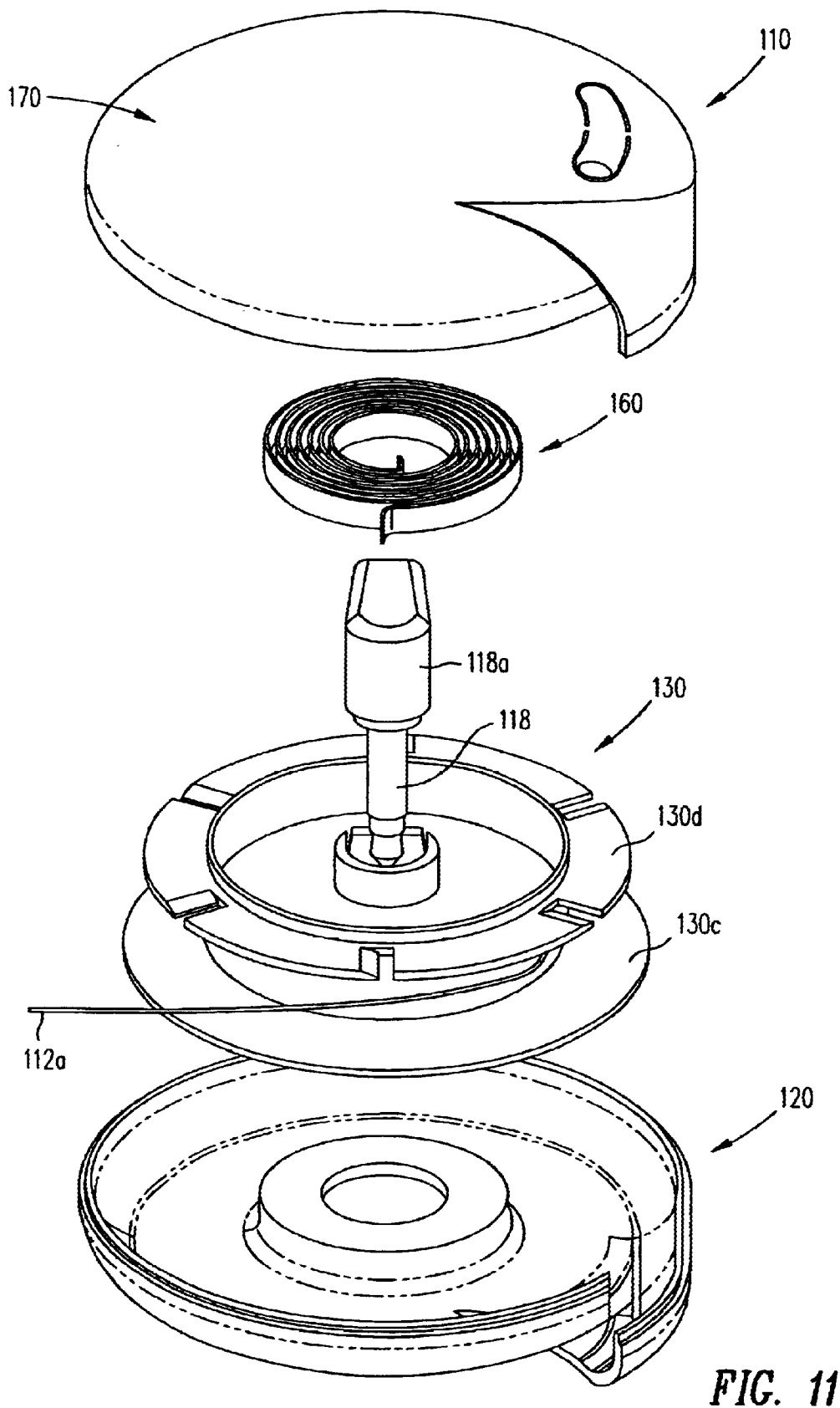
FIG. 11 is an exploded view of the alternative second embodiment of the present invention similar to FIG. 5B.

The phone jack body 118a is fixedly attached to the center of the spool 130 so that the axis of the metal jack protrusion 118 is on the axis of rotation of the spool 130. The phone jack 118–118a rotates with the spool 130 so the phone jack must rotate in a mating jack connector 118b connected via a cable 118c to another connector 119 as shown in FIG. 8.

Figure 12:
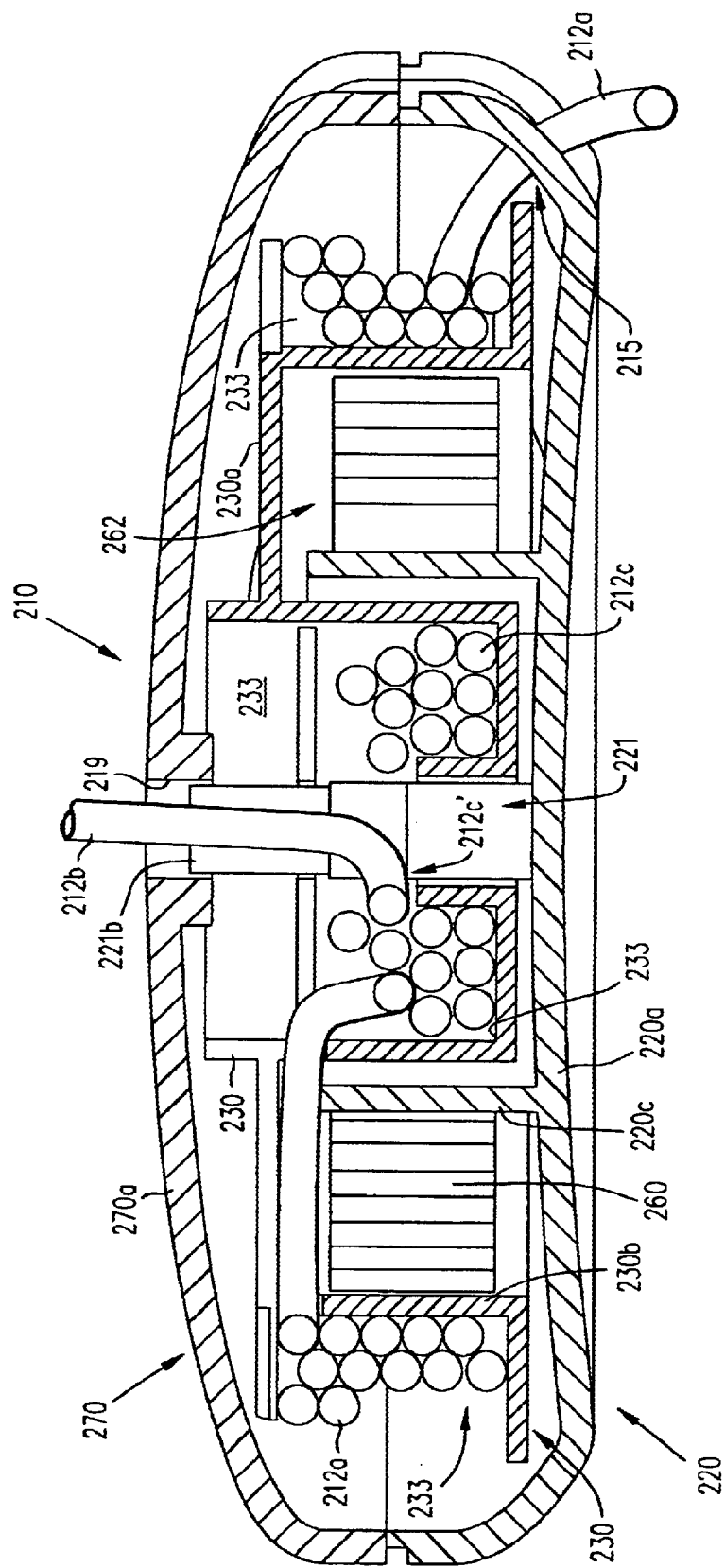
FIG. 12 is a cross sectional view similar to FIG. 4 showing an alternative third embodiment of the present invention.
Figure 13:
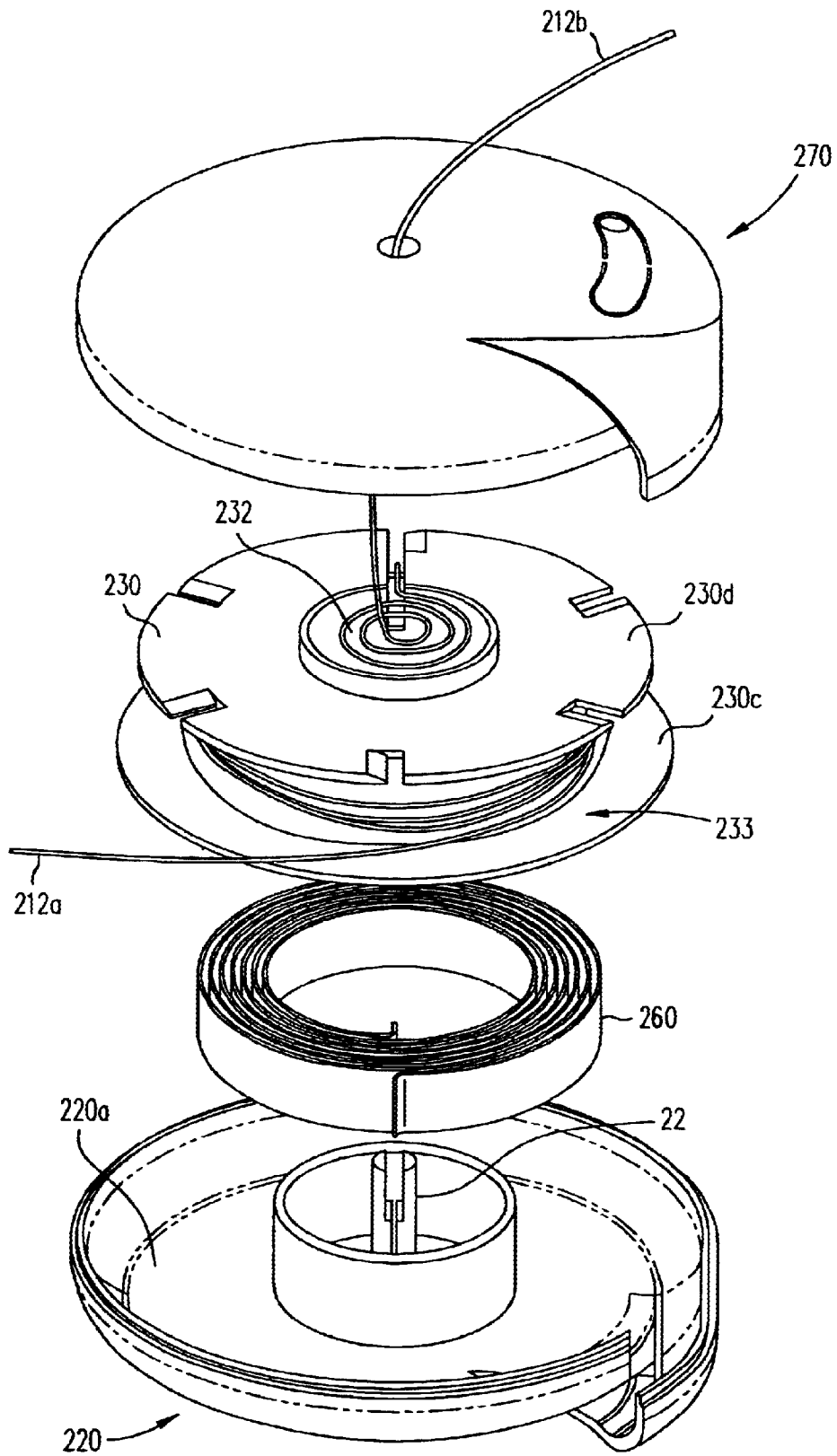
FIG. 13 is an exploded view of the parts of the alternative third embodiment similar to FIG. 5B.

An alternative third embodiment of the present invention is illustrated in FIGS. 12–13 13 where the elements similar to the elements of the first embodiment are identified with similar reference numbers with the addition of an "2."

In the alternative third embodiment the reversible winding chamber 232 and the earphone cord winding cavity 233 are located in the same plane with the reversible winding cavity 232 radially inward from the earphone winding cavity 233 and with the spring located in a spring cavity 262 in the same plane and in between the cavities 232 and 233. The inner end 260a of the spring 260 is connected to an annular rib 220c of the bottom shell 220, and the spring outer end 260b is connected to the cavity wall 230b of the spool 230.

The operation of this third embodiment is such that when the earphone end portion 212a of the cord 212 is pulled out of the housing 210, it unwinds off the outer winding chamber 233 on the spool 230. The cord 212 is fixed at the point 212a' where it enters the inner reversible winding chamber 232 and at the point 212c' where it exits the inner reversible winding chamber 232 through the slot 221b in the spindle 221. The cord 212 exits the outer winding chamber 233 through an orifice 215. In this third embodiment, the middle portion 212c of the cord 212 could also be constrained in one plane as in the first embodiment.

Figure 14:
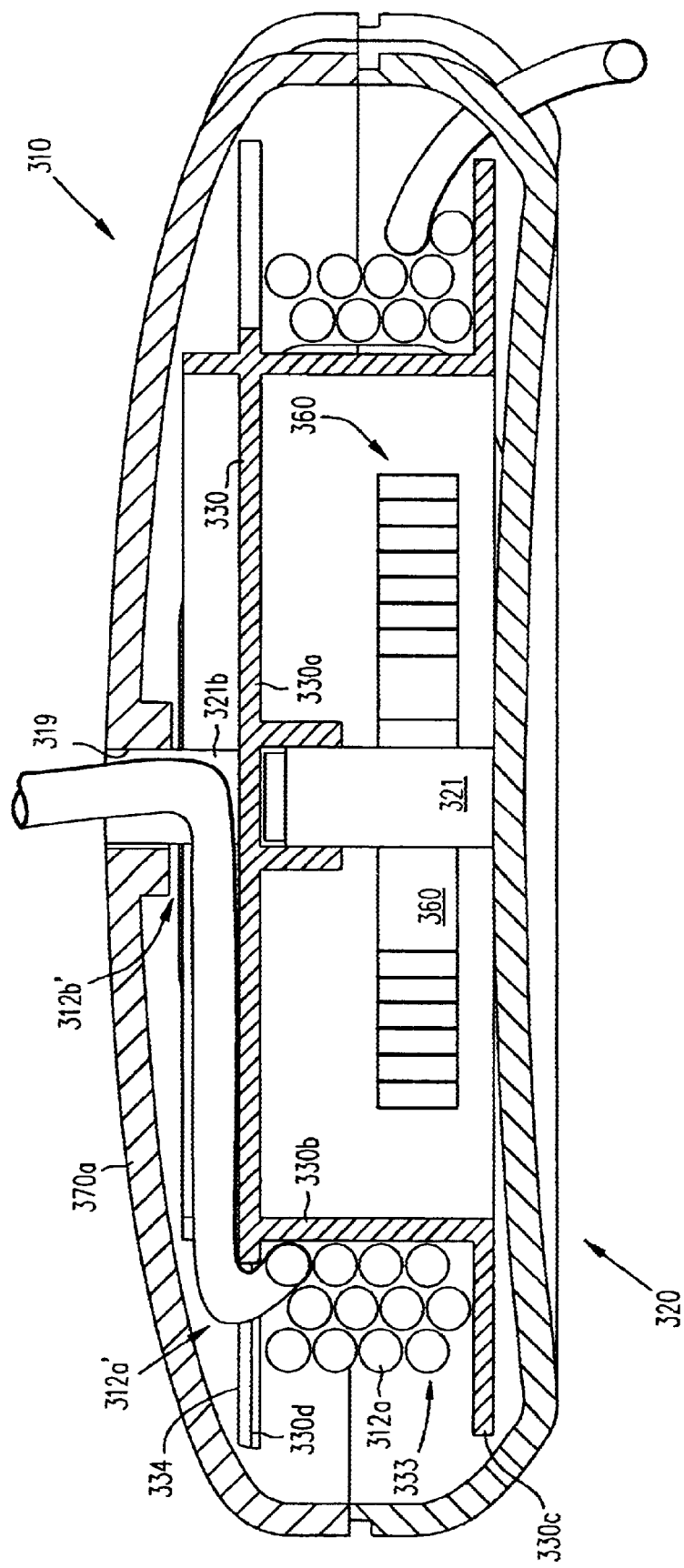
FIG. 14 is a cross sectional view similar to FIG. 4 but of a fourth embodiment of the present invention.
Figure 15:
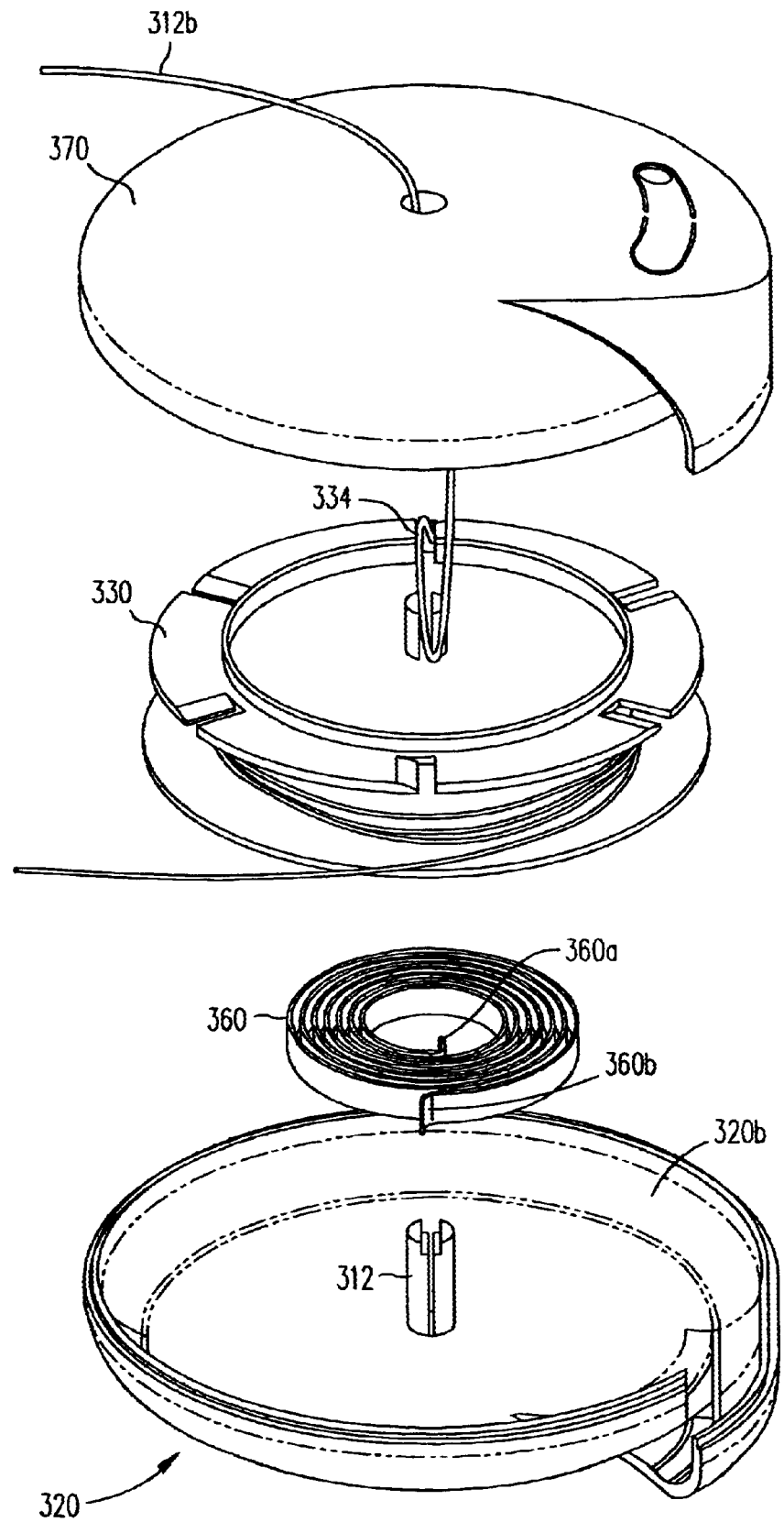
FIG. 15 is an exploded view of the fourth embodiment similar to FIG. 5B.

FIGS. 14 and 15 illustrate a fourth embodiment of the present invention and wherein the elements similar to the elements in the first embodiment in FIGS. 1–7 are identified by numbers which begin with a "3." This embodiment does not have a reversible winding cavity.

In the housing 310 of the fourth embodiment the earphone end portion 312a of the cord 312 is wound around the cavity wall 330b of the spool 330 in cavity 333. The cord is fixed at the point 312a' where it leaves the external winding cavity 333 at a cord slot 334 and is also fixed at a point 212b' where it enters the slot 321b in the spindle 321. Therefore, when the cord is extracted out of the housing 310, the length of cord 312 that is exiting the housing 310 through the spindle 321 is twisted. Likewise, when the latch is released and the spring 360 rotates the spool 330 to wind the earphone end portion 312a, the length of cord exiting the center device at opening 319 untwists.

Figure 16:
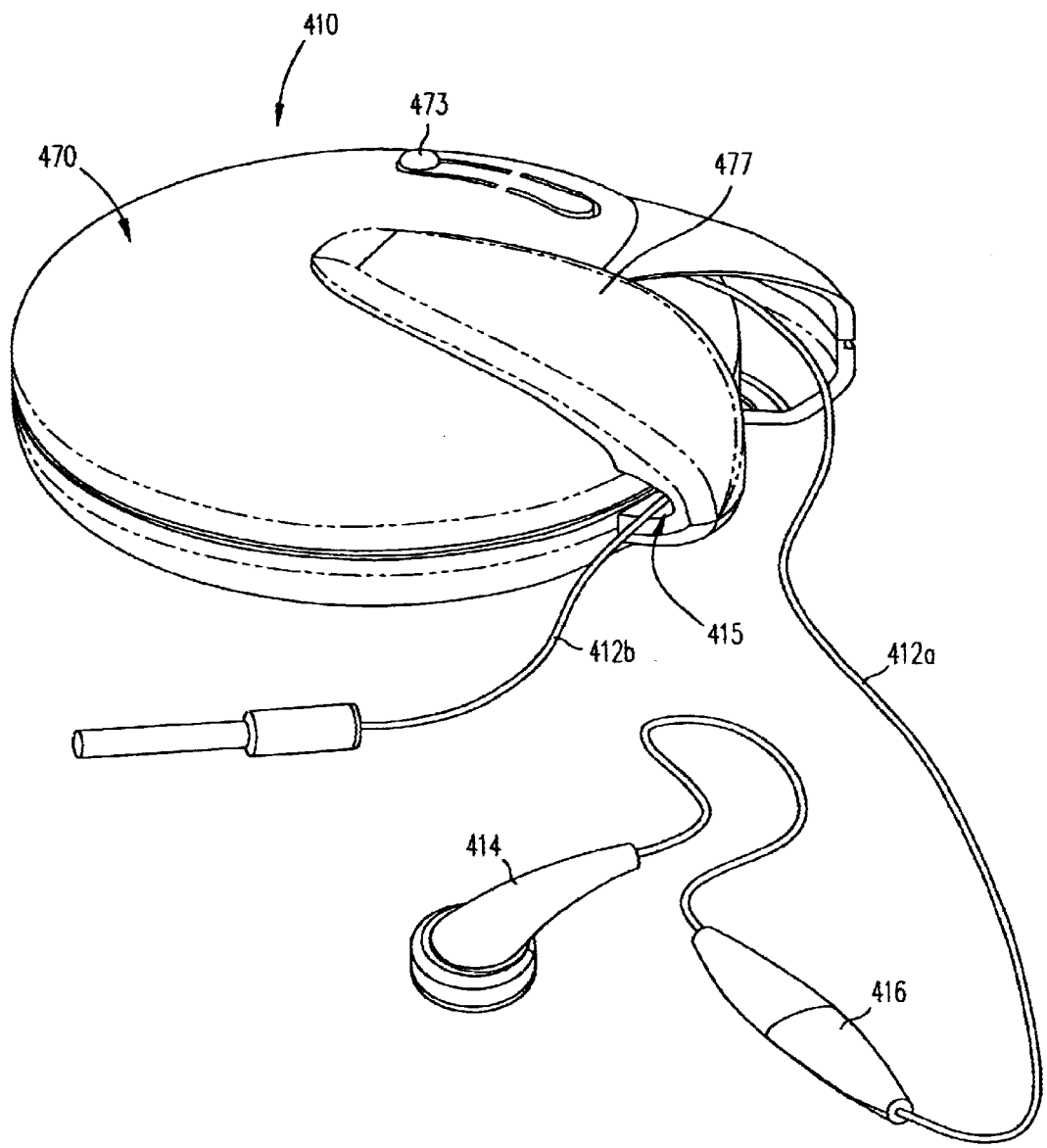
FIG. 16 is a perspective view similar to FIG. 1A but of a fifth embodiment of the present invention.
Figure 17:
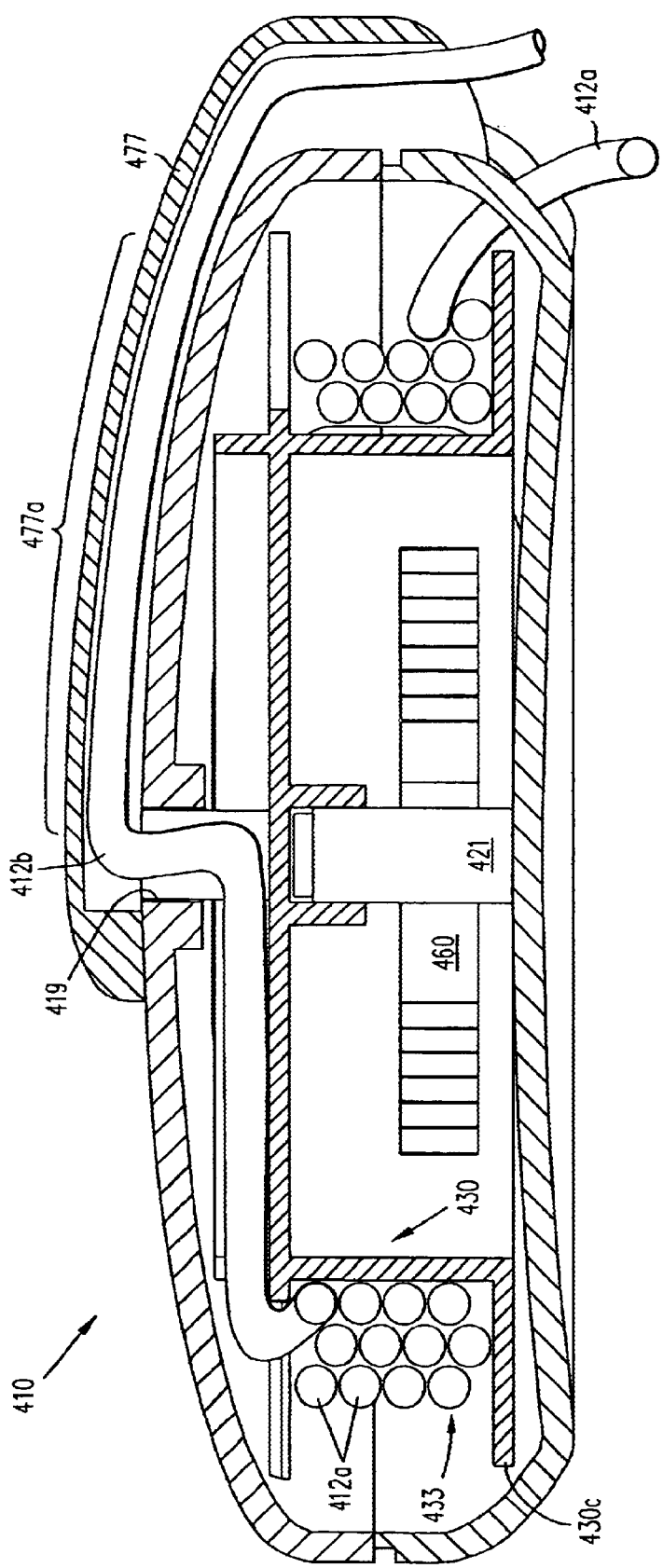
FIG. 17 is a cross sectional view similar to FIG. 4 but of the fifth embodiment of the present invention.
Figure 18:
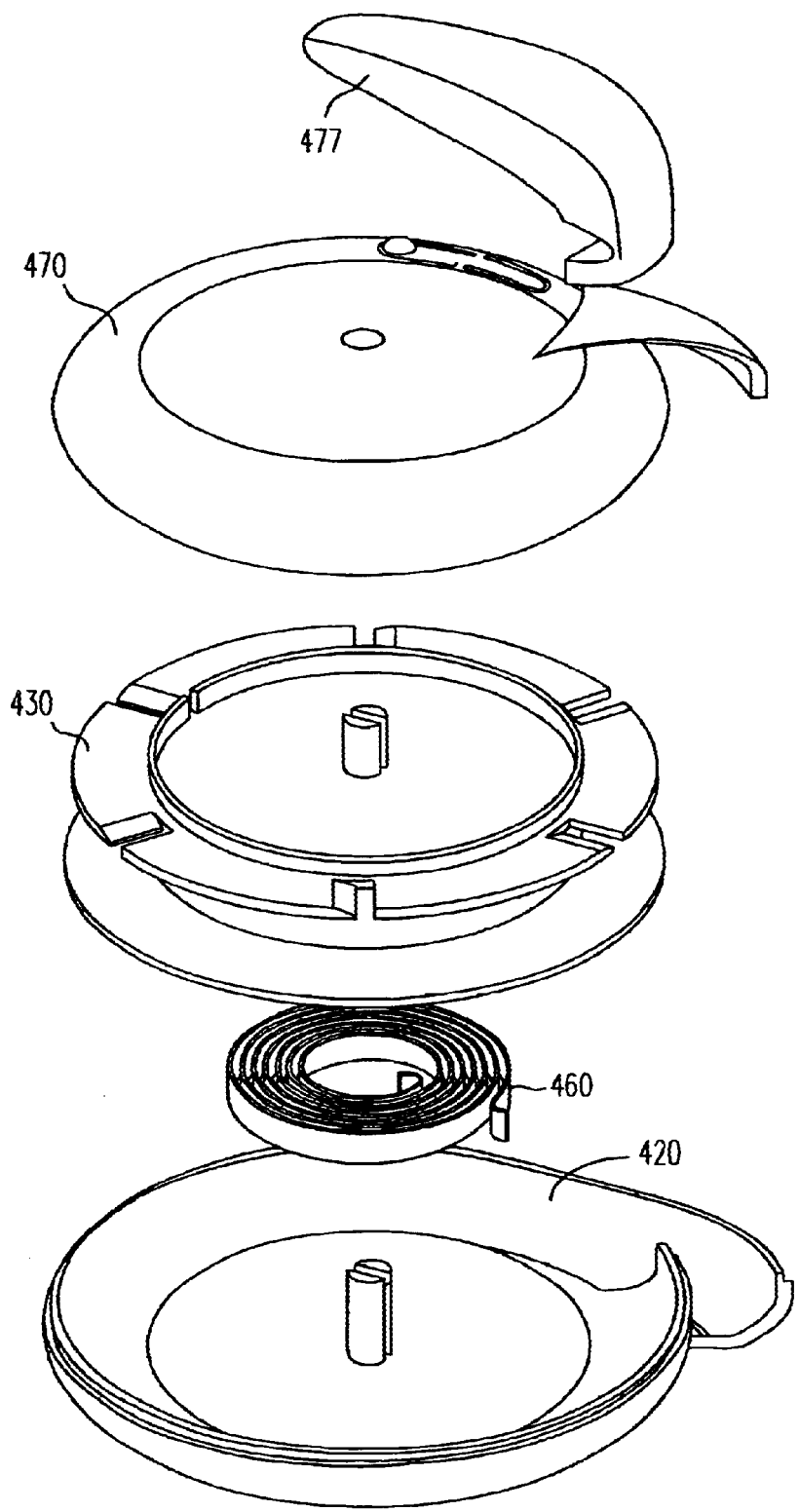
FIG. 18 is an exploded view similar to FIG. 5A of the fifth embodiment of the present invention.

A fifth embodiment of the present invention is illustrated in FIGS. 16–18 wherein the components have similar numbers to the components shown in the first embodiment of FIGS. 1–7 with the addition of a number "4."

The fifth embodiment of the present invention shown in FIGS. 16–18 is similar to the fourth embodiment shown in FIGS. 14–15 where the cord is fixed internally but is allowed to twist or untwist externally when the spool 430 rotates. In this embodiment the cord 412 can twist and untwist external to the main housing 410 but still covered by an external cord cover 477. The connector end portion 412b of the cord 412 is connected to the external cord cover 477 just before exiting through the connect end orifice so that the twisting section of the cord is located in the region 477a shown in FIG. 17.

Figure 19:
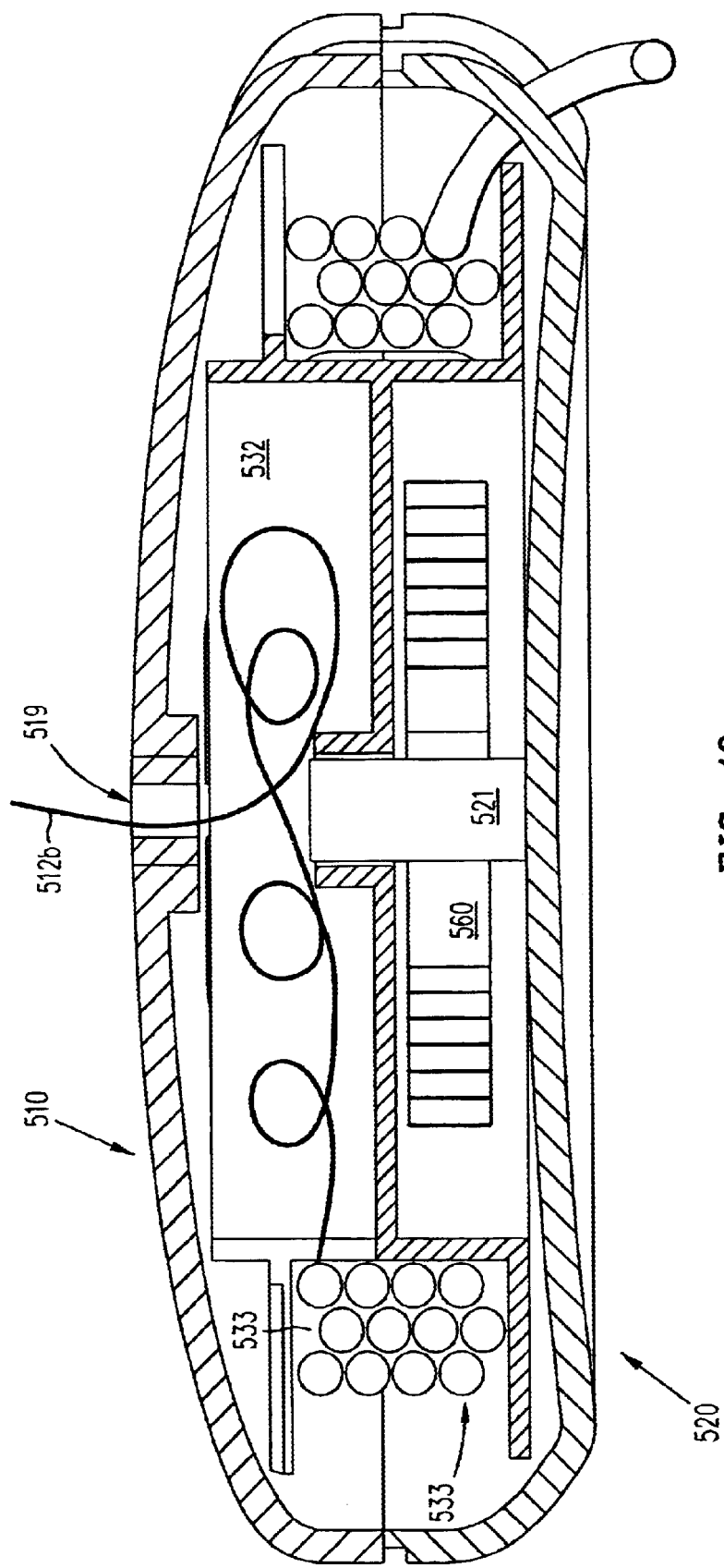
FIG. 19 is a sectional view of a sixth embodiment of the present invention similar to FIG. 17.

A sixth embodiment of the present invention is illustrated in FIG. 19 which is substantially similar to the fifth embodiment but wherein the spindle 521 is foreshortened allowing the space there above to accommodate cord twist associated with a rotation of the spool 530 in a twist chamber 532. The device functions similar to the fifth embodiment where the spring 560 is connected to the spool 530 and to the bottom shell 520. The spring is wound when the earphone end portion 512a of the cord 512 is extracted from the device and provides the retraction energy to wind the earphone end cord portion 512a back in the housing 510. For simplicity sake, the part of the cord 512 that extends from the outer winding chamber 533 to the cord twist chamber 532 is depicted as a thick black line. The cord 512 is fixed at the point where it enters the cord twist chamber 532 from the outer winding chamber 533 and where it exits the device in the top center 519 in the top shell 570.

Figure 20:
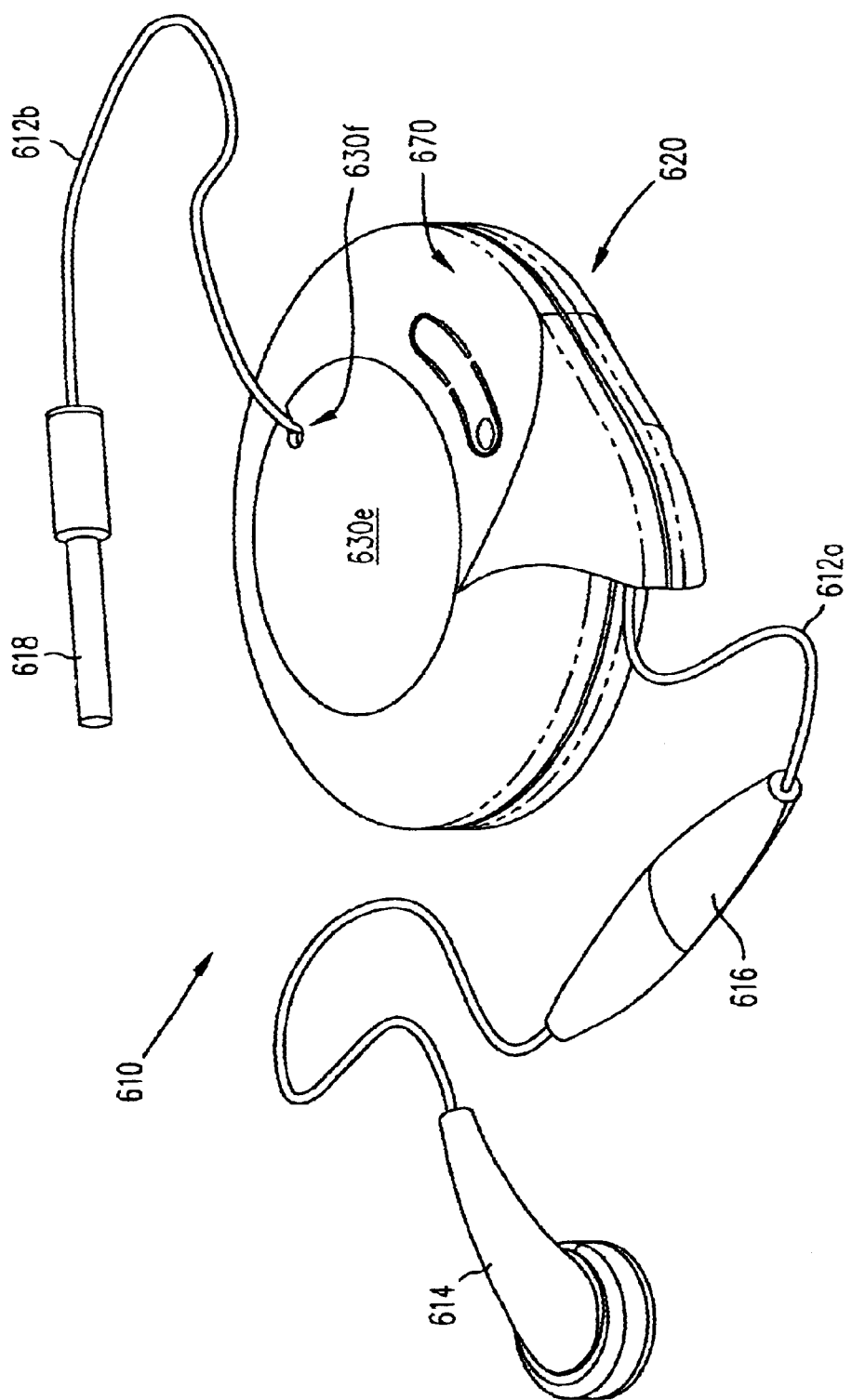
FIGS. 20, 21 and 22 are similar to FIGS. 1A, 4 and 5A respectively and illustrate a seventh embodiment of the present invention.
Figure 21:
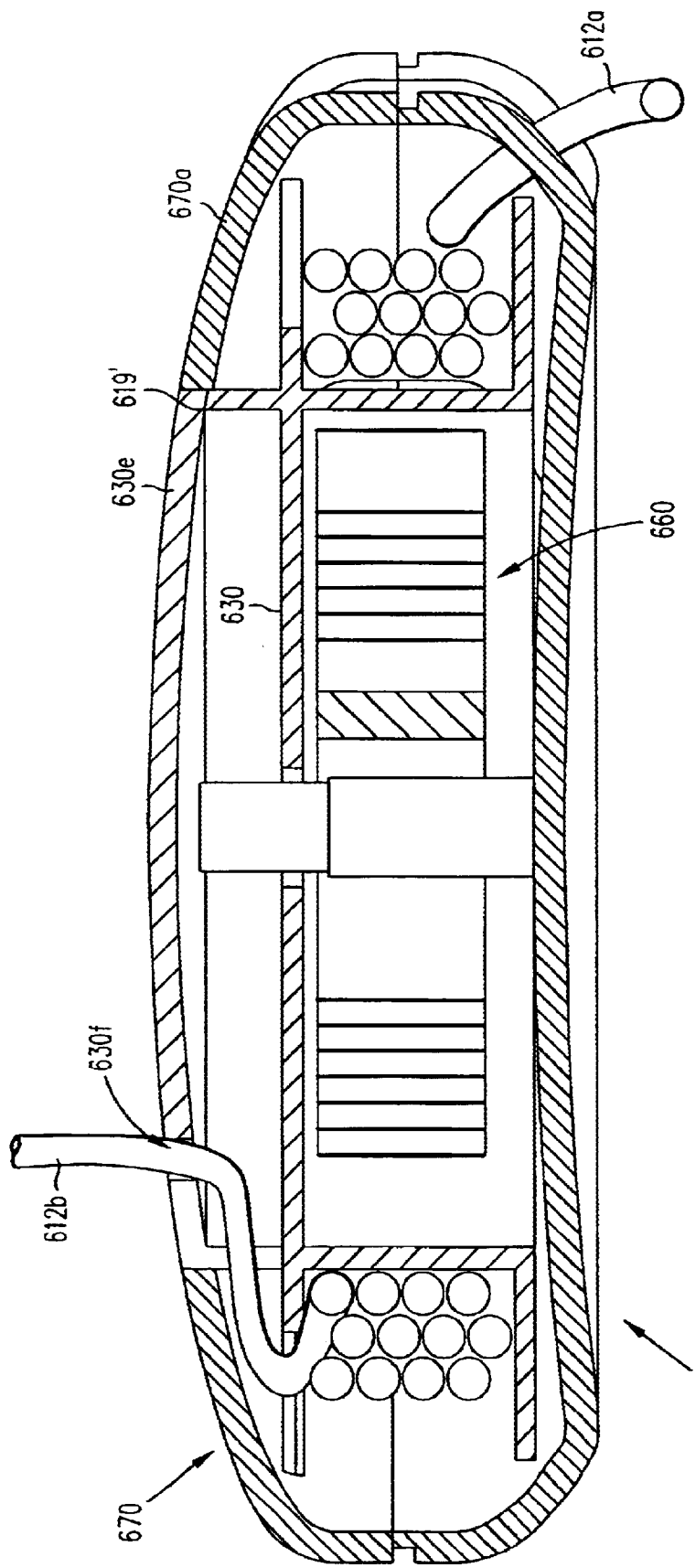
Figure 22:
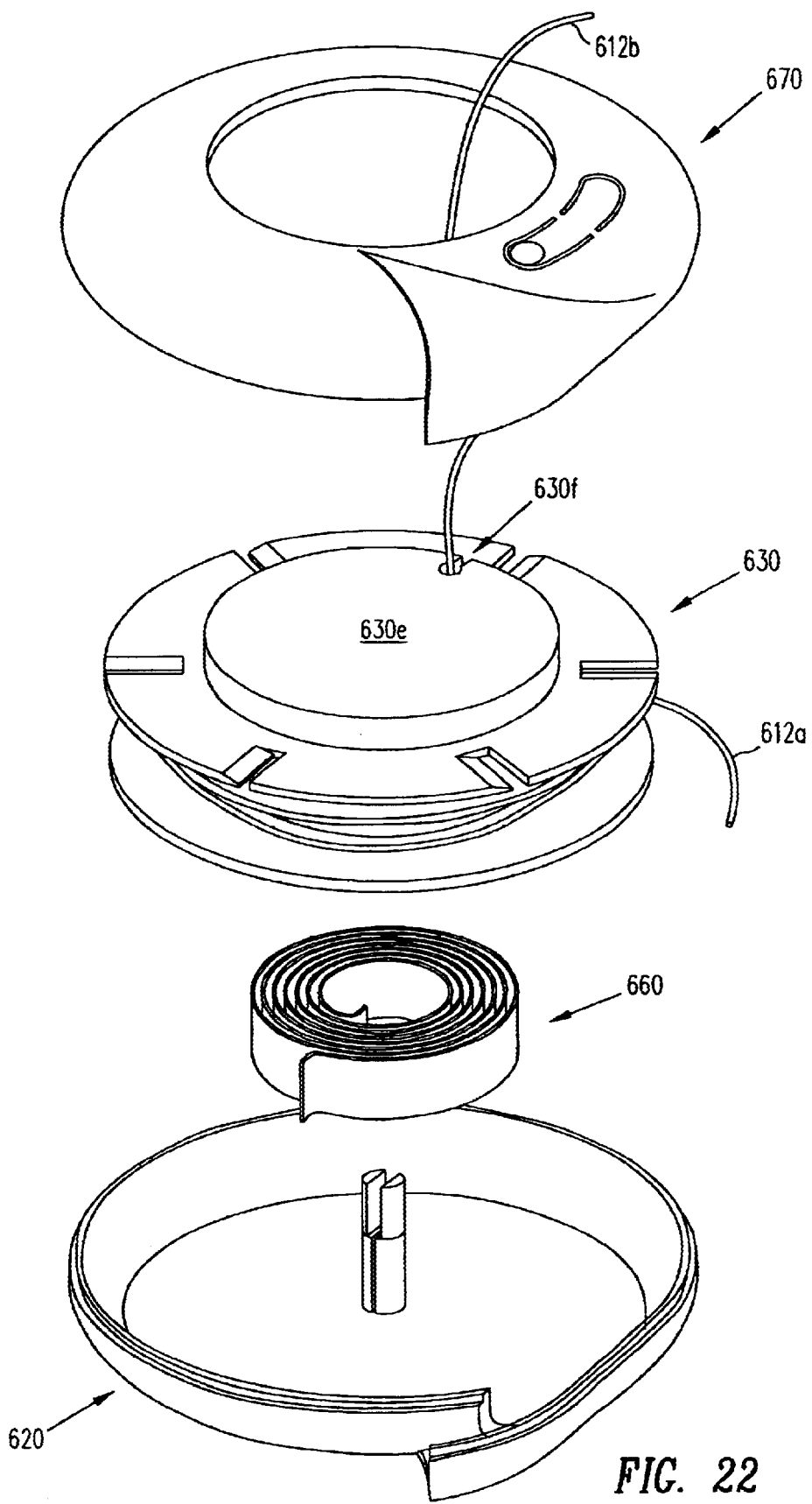

A seventh embodiment of the present invention is illustrated in FIGS. 20–22 and wherein the spool 630 includes a domed upper surface which projects through an enlarged opening 619' in the top surface 670a of the top shell 670 and has a opening 630f in which the connector end portion 612b is fixed. The connector end portion 12b of the cord 12 rotates around as the spool 630 rotates.

Figure 23:
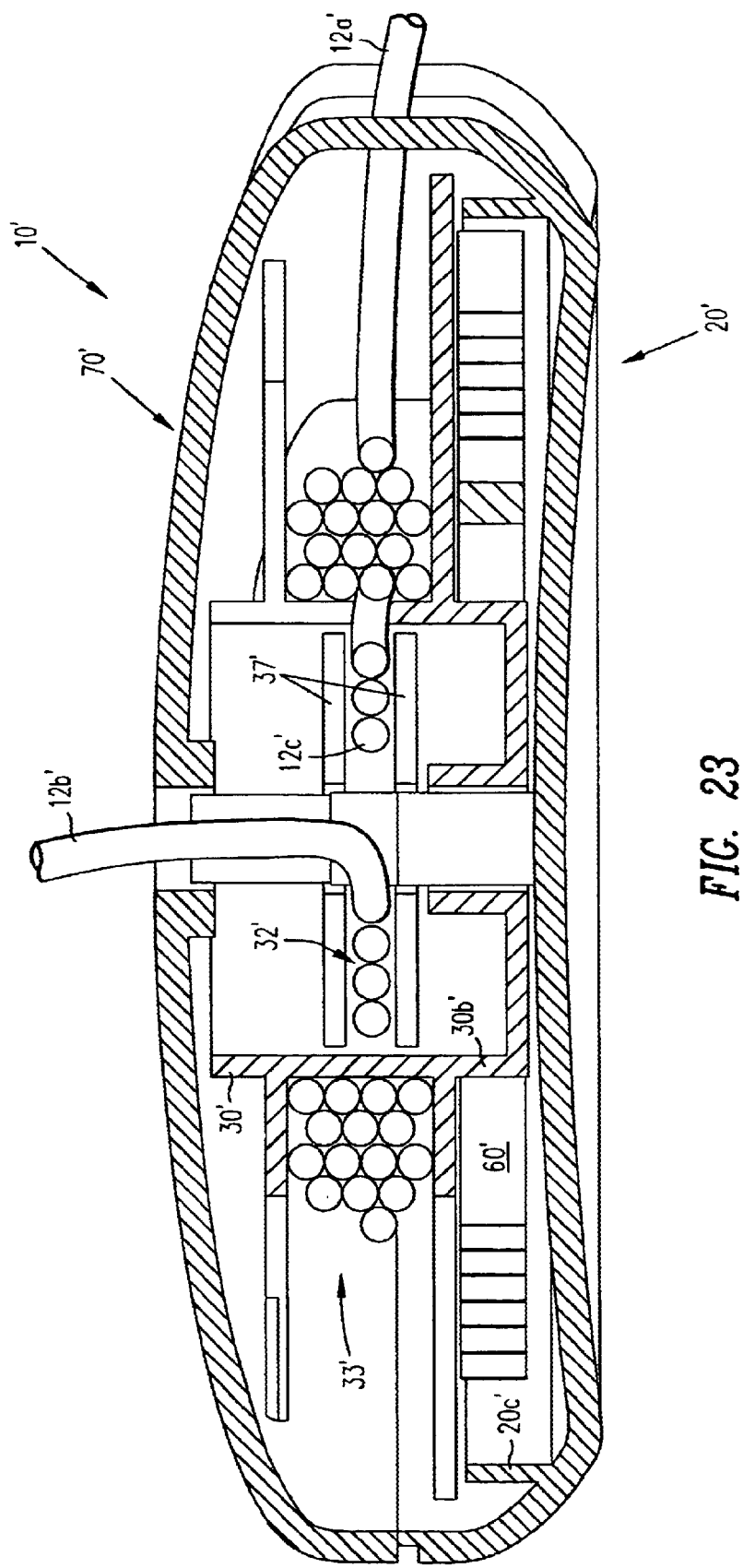
FIGS. 23 and 24 show two versions of alternative constructions of the structure shown in FIG. 4.
Figure 24:
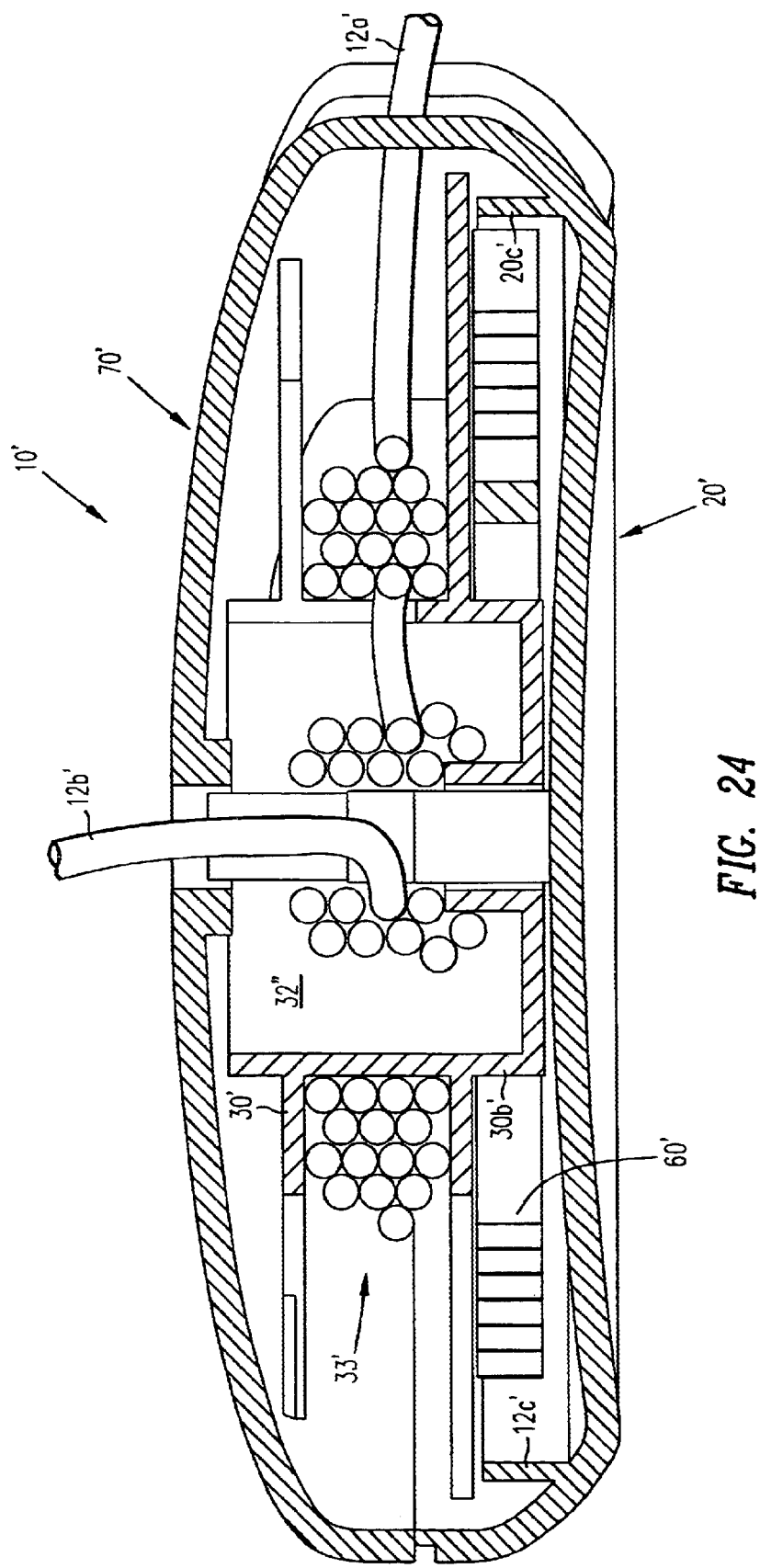
Figure 32:
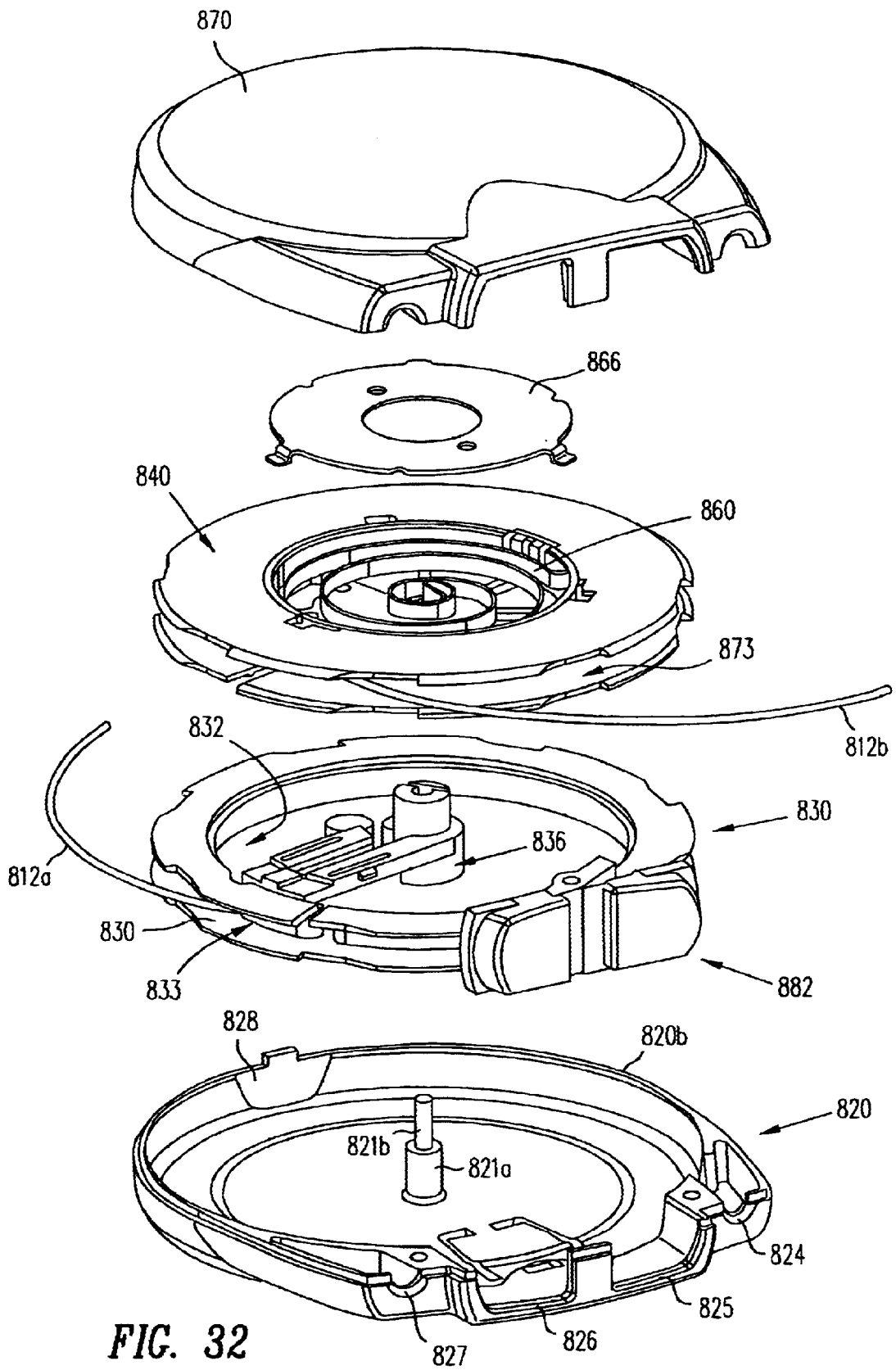
Figure 33A:
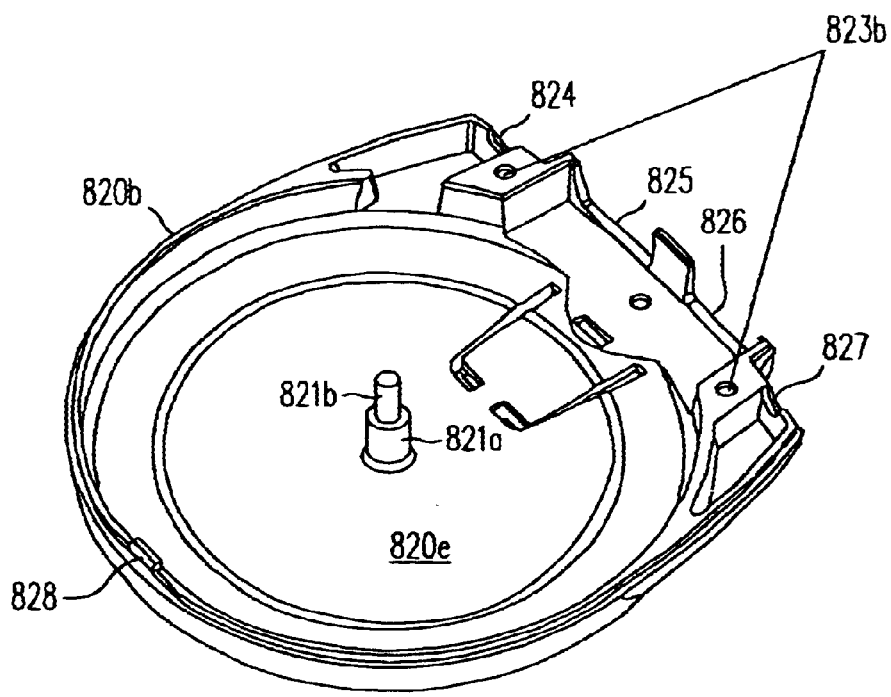
FIGS. 33A and 33B are a top and bottom views, respectively, of the bottom shell.
Figure 33B:
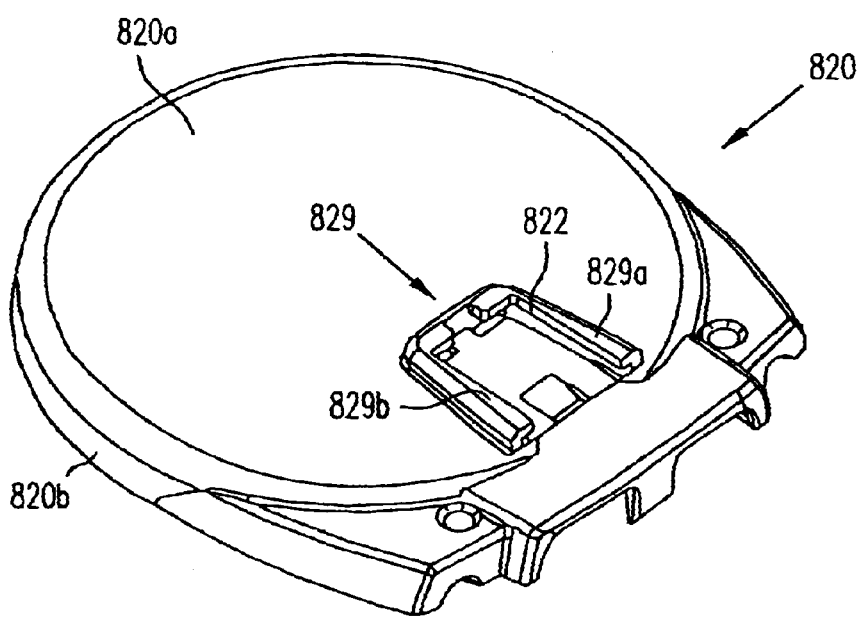
Figure 34A:
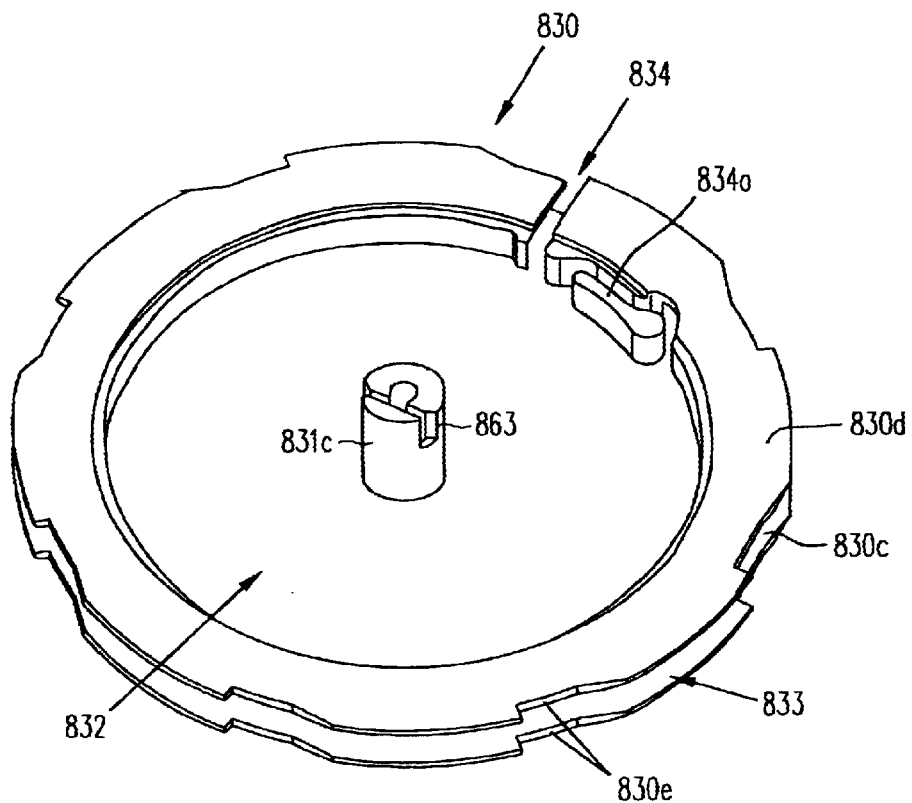
FIGS. 34A and 34B are top and bottom views, respectively, of the bottom spool.
Figure 34B:
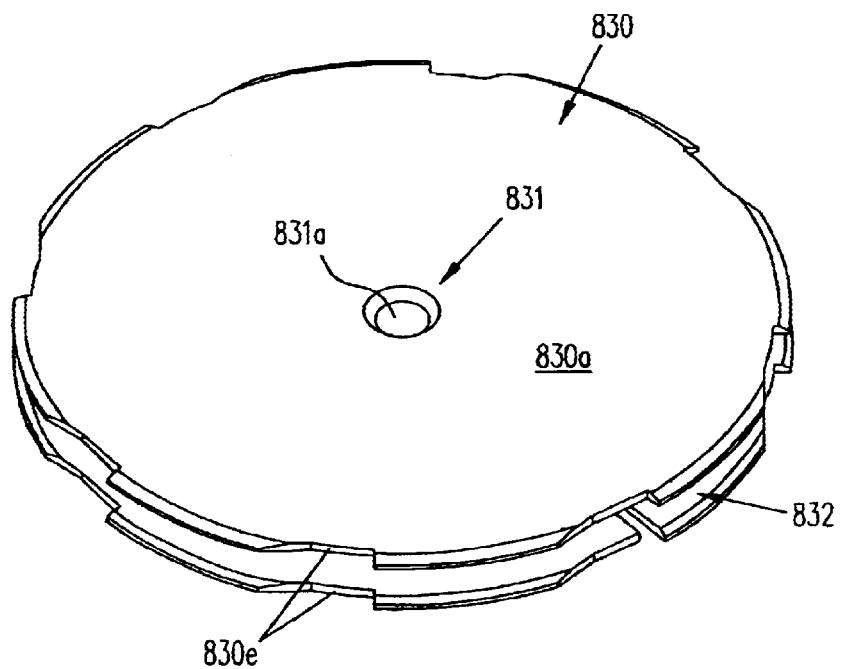
Figure 35A:
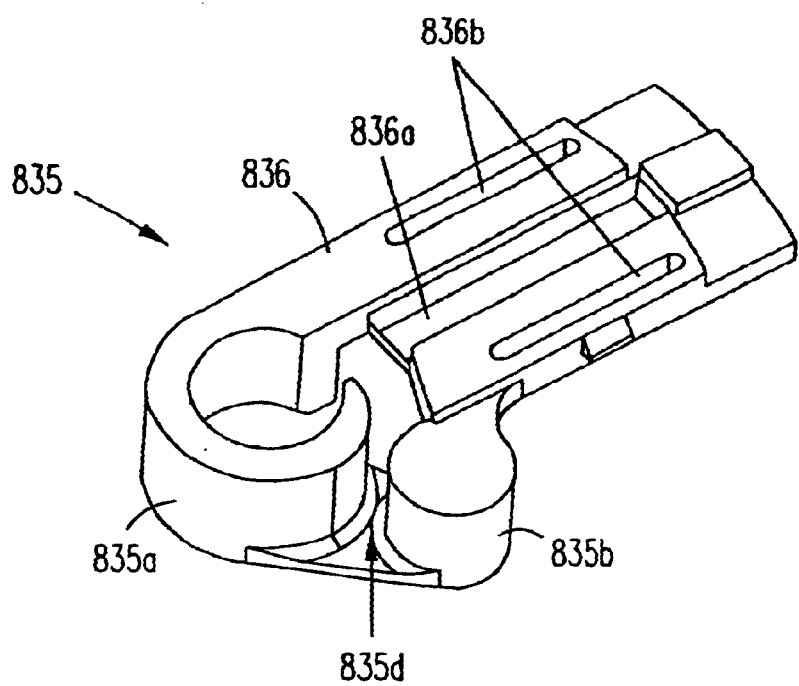
FIGS. 35A and 35B are top and bottom views, respectively, of a cord retainer.
Figure 35B:
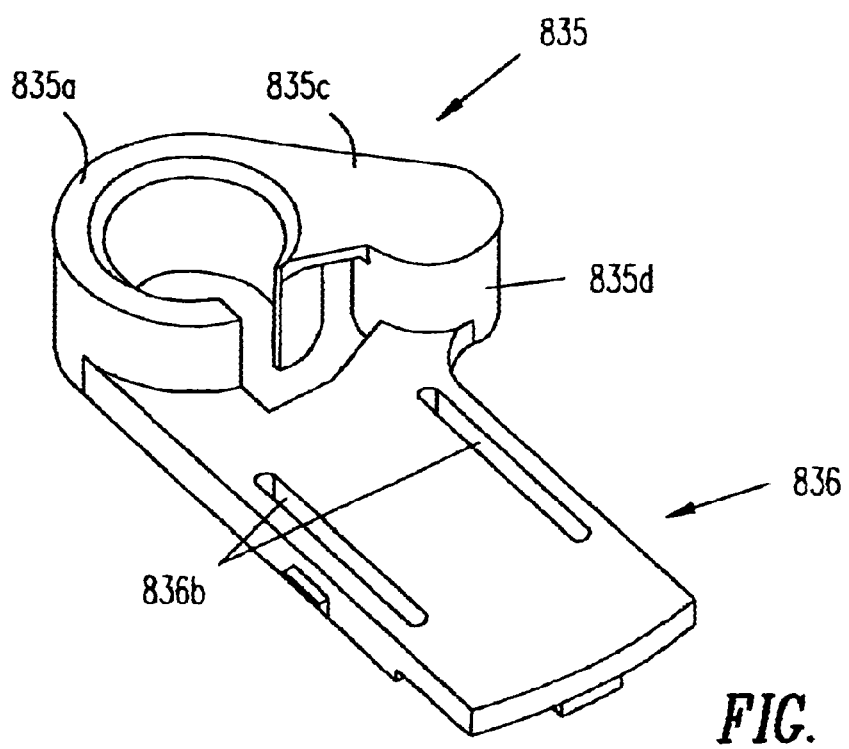
Figure 36A:
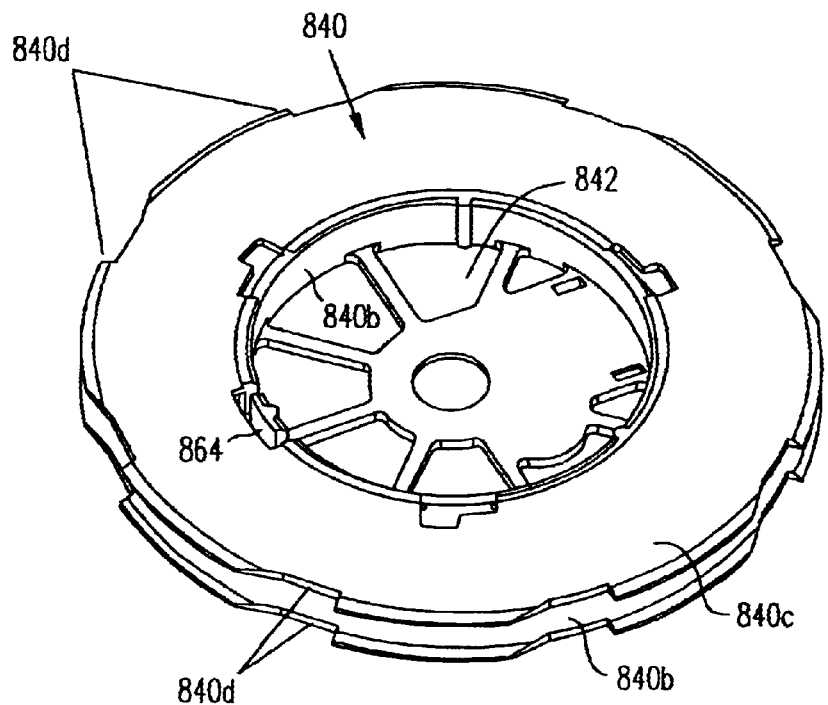
FIGS. 36A and 36B are top and bottom views of the top spool and FIGS. 37A and 37B are top and bottom views, respectively, of the top shell of the tenth embodiment of the invention as those elements are arranged in ascending sequence in FIG. 32.
Figure 36B:
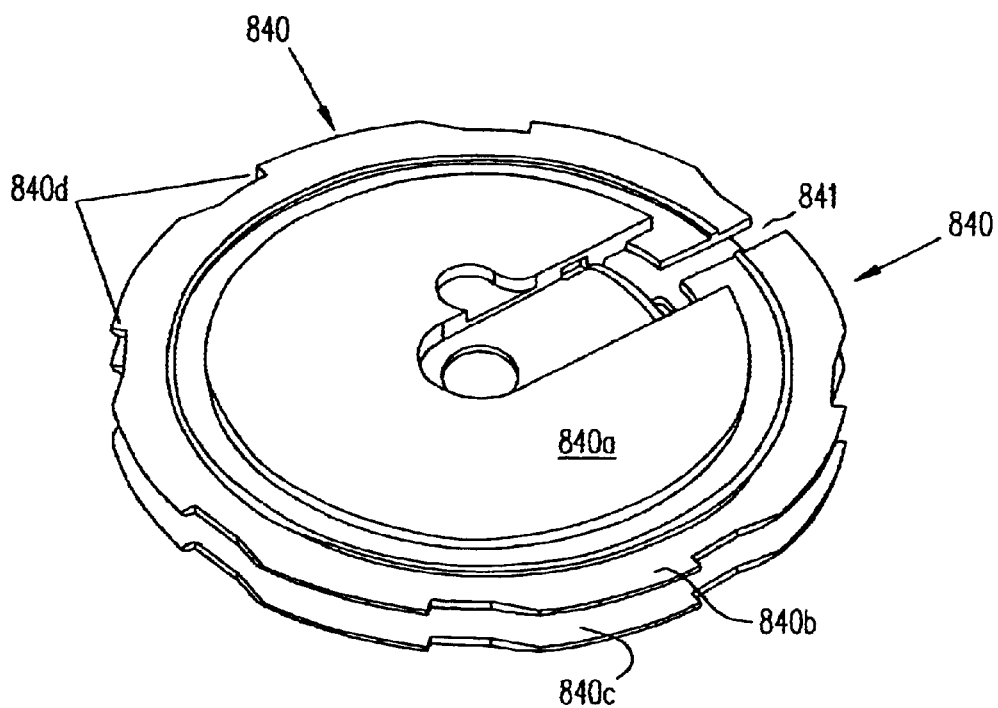
Figure 37A:
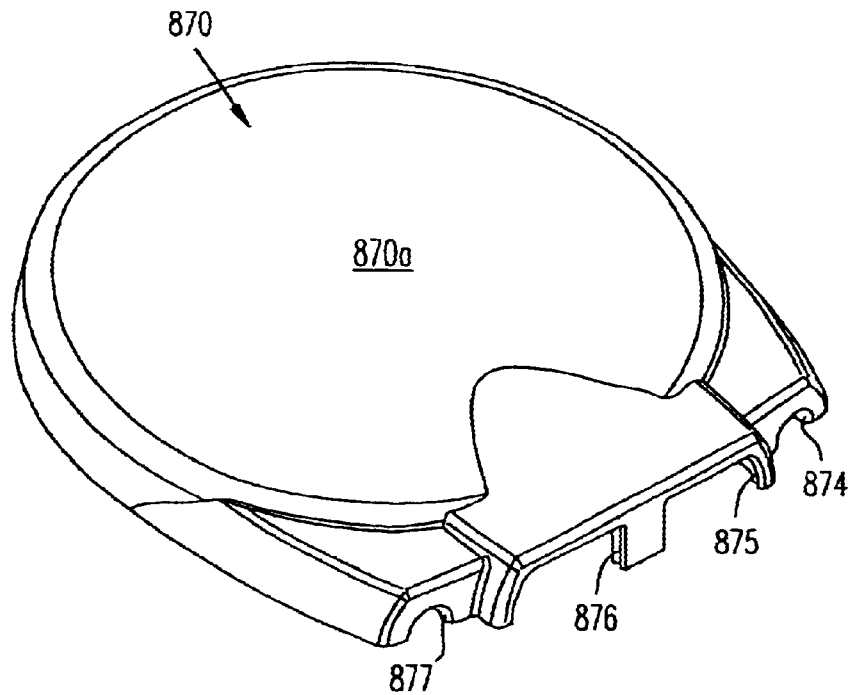
Figure 37B:
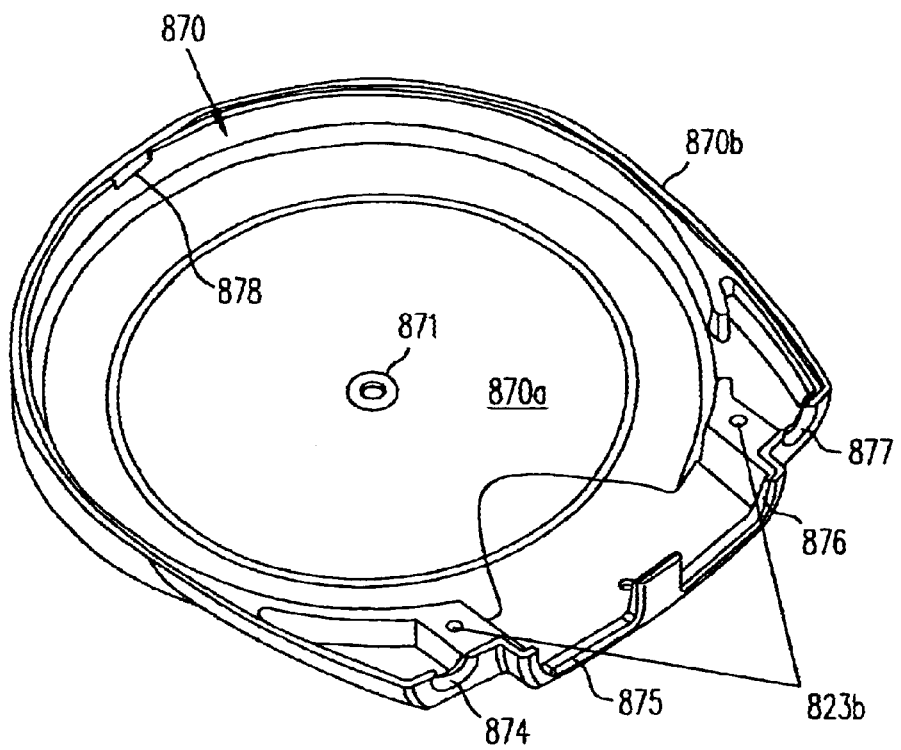
Figure 38A:
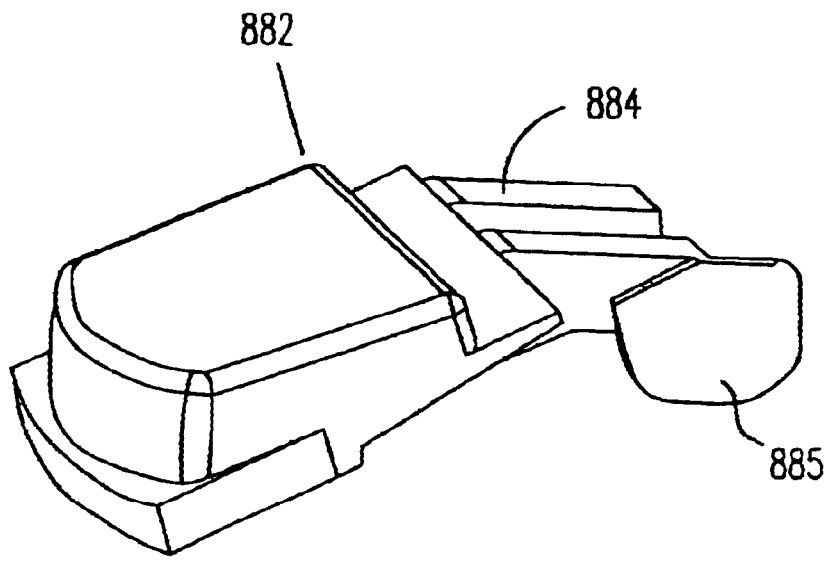
FIGS. 38A and 38B are top and bottom views, respectively, of the ratchet buttons to clamp and release the extraction or return of the cord portions from and into the housing.
Figure 38B:
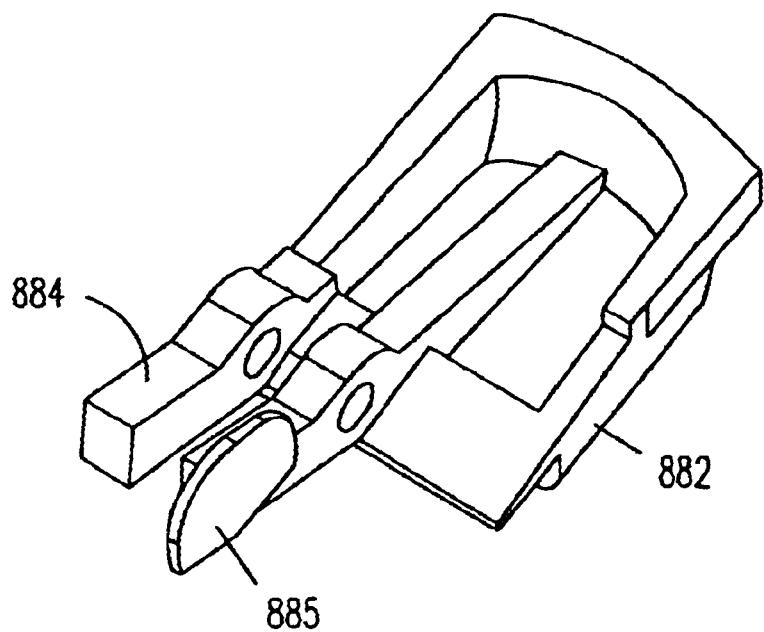
Figure 39A:
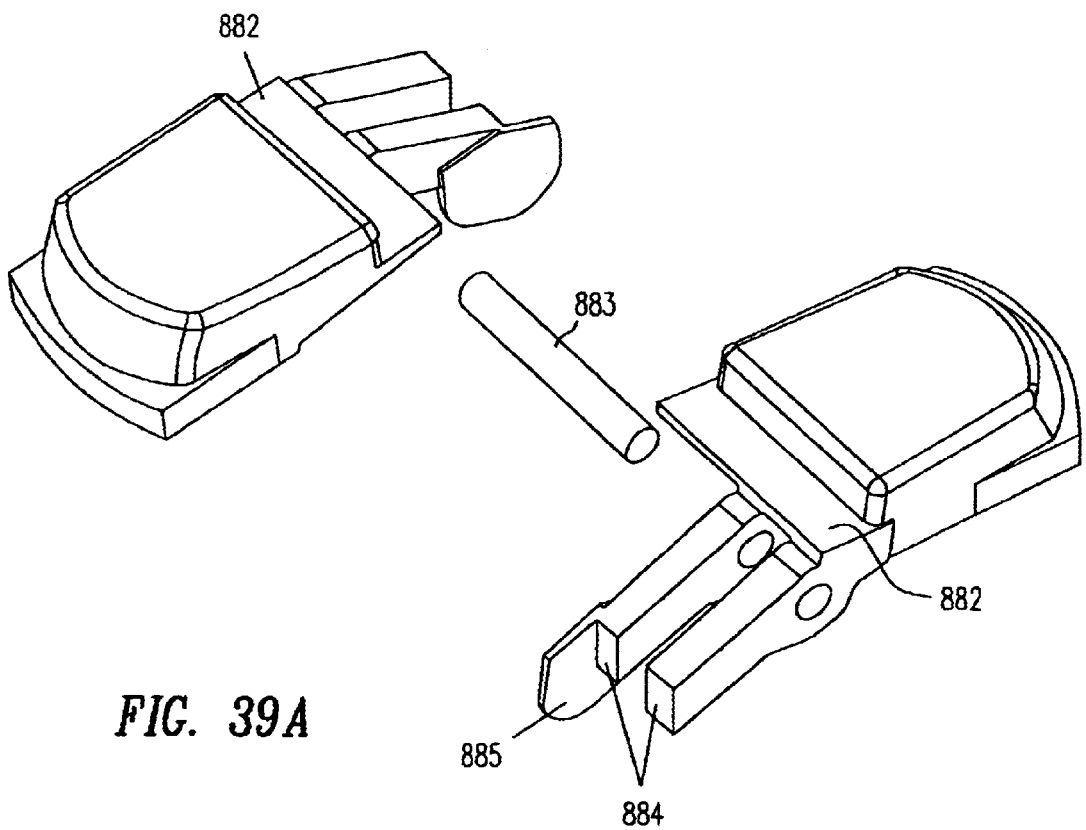
FIG. 39A shows an exploded top perspective view of two buttons prior to their combination assembly and FIGS. 39B shows a perspective bottom view of the two ratchet buttons in assembled position.
Figure 39B:
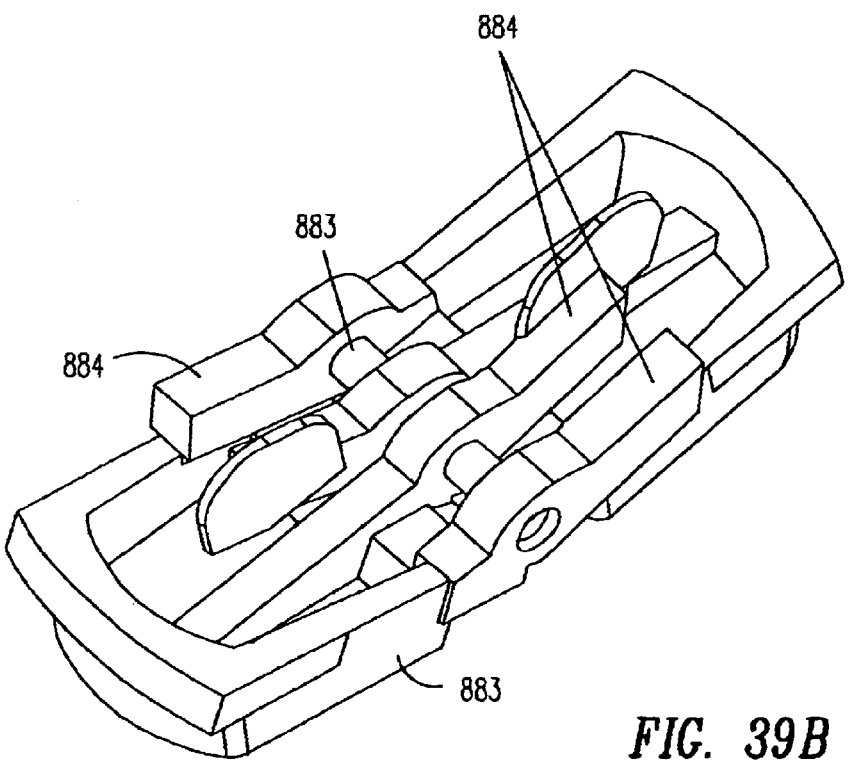

Two alternative versions of a modification of the structure shown in FIG. 4 are illustrated in FIGS. 23 and 24. Each of the housings 10' include similar bottom and top shells 20' and 70' respectively, with a spool 30 having an outer earphone cord winding cavity 33 and a central reversible winding cavity 32' in FIG. 23 and 32" in FIG. 24. In each of the embodiments shown in FIGS. 23 and 24, the bottom shell 20 includes a vertical wall 20c'. The inside end of the power spring 60' is connected to the center section 30b' of the spool 30'. The spring outer end is connected to the vertical wall 20c'. The embodiment of FIG. 23 two winding constraints plates 37' keep the center winding spiral in one plane. In the reversible winding cavity 32" in FIG. 4, the connector end portion 17b' of the cord 12' is not constrained to one plane.

A ninth embodiment of the present invention utilizing dual independent spools and one spring is illustrated in FIGS. 25–28.

Figure 25:
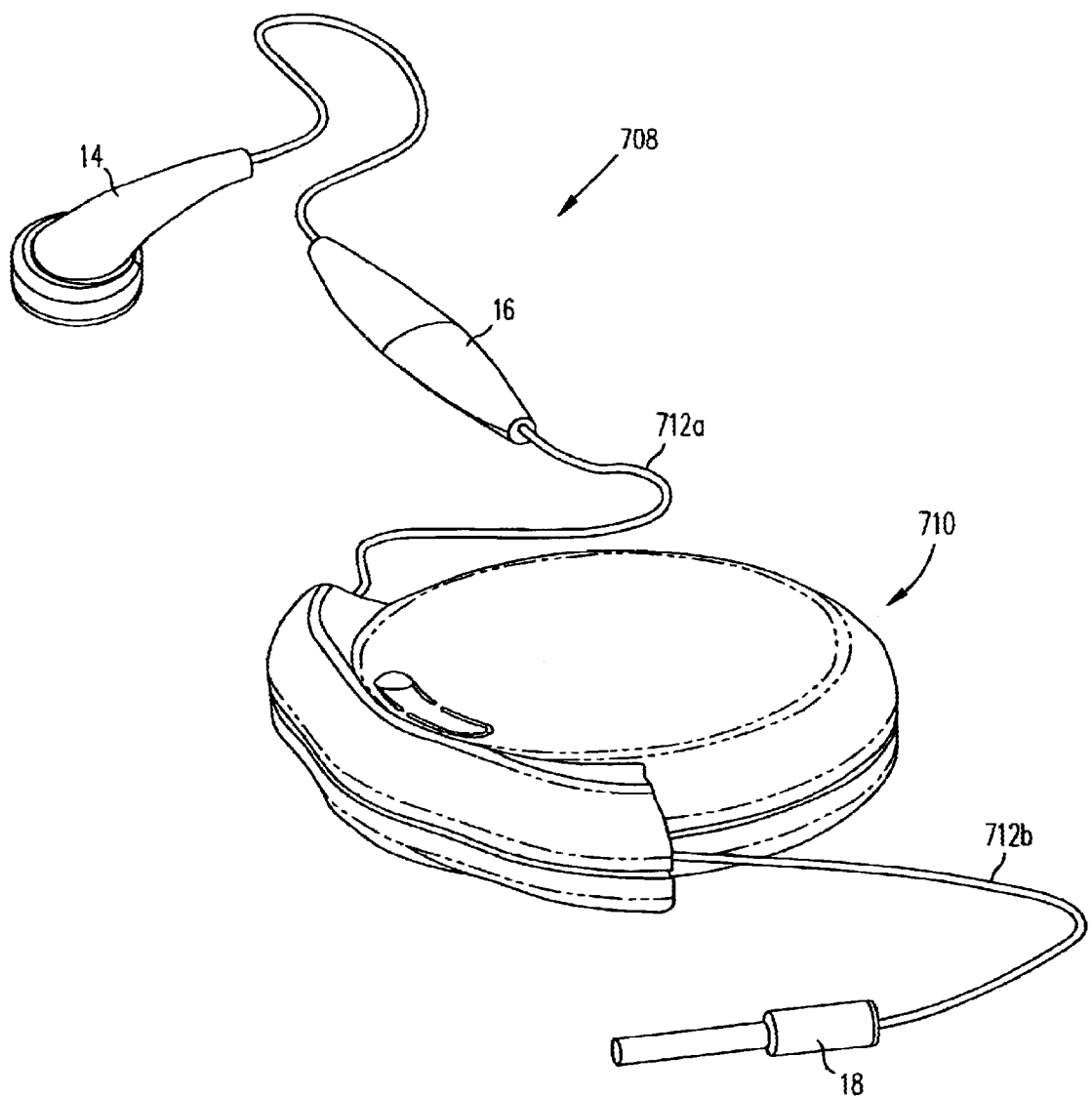
FIGS. 25, 26 and 27 which are similar to FIGS. 1A, 4 and 5B show a ninth embodiment of the invention utilizing two spools and one spring.
Figure 26:
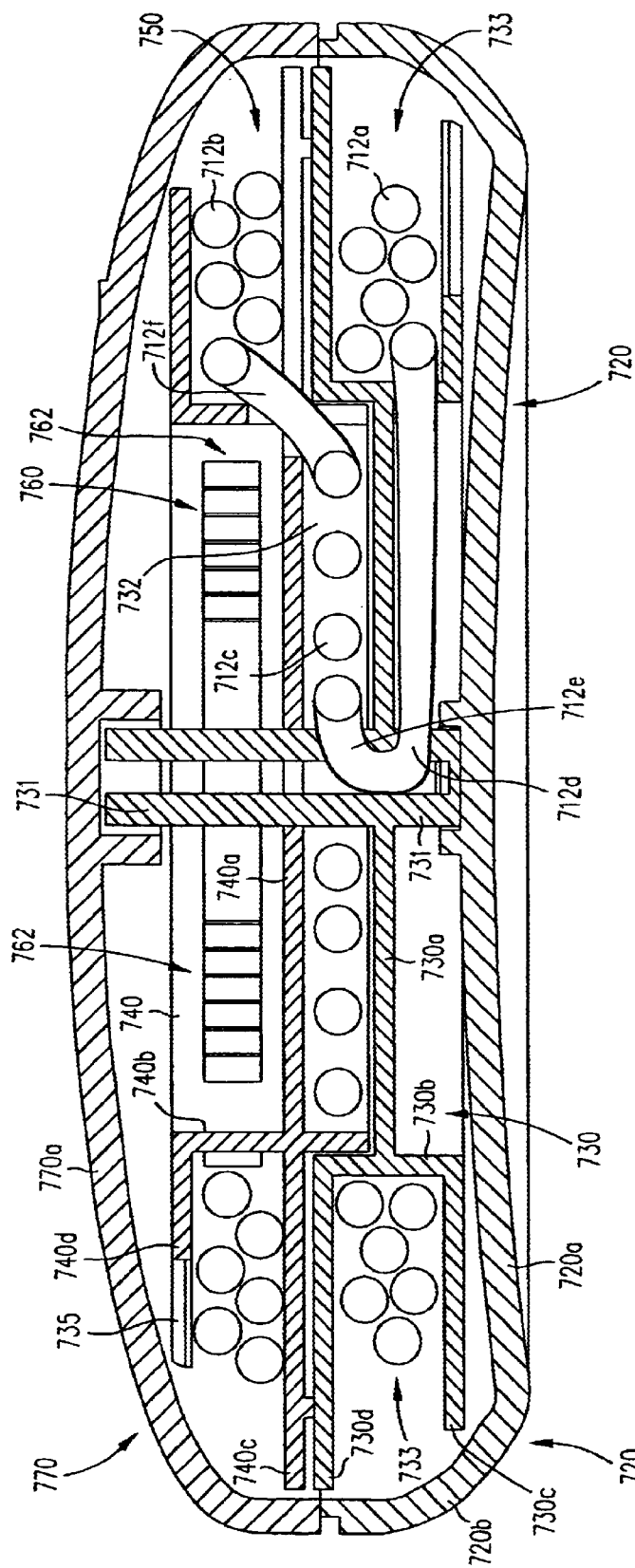
Figure 27:
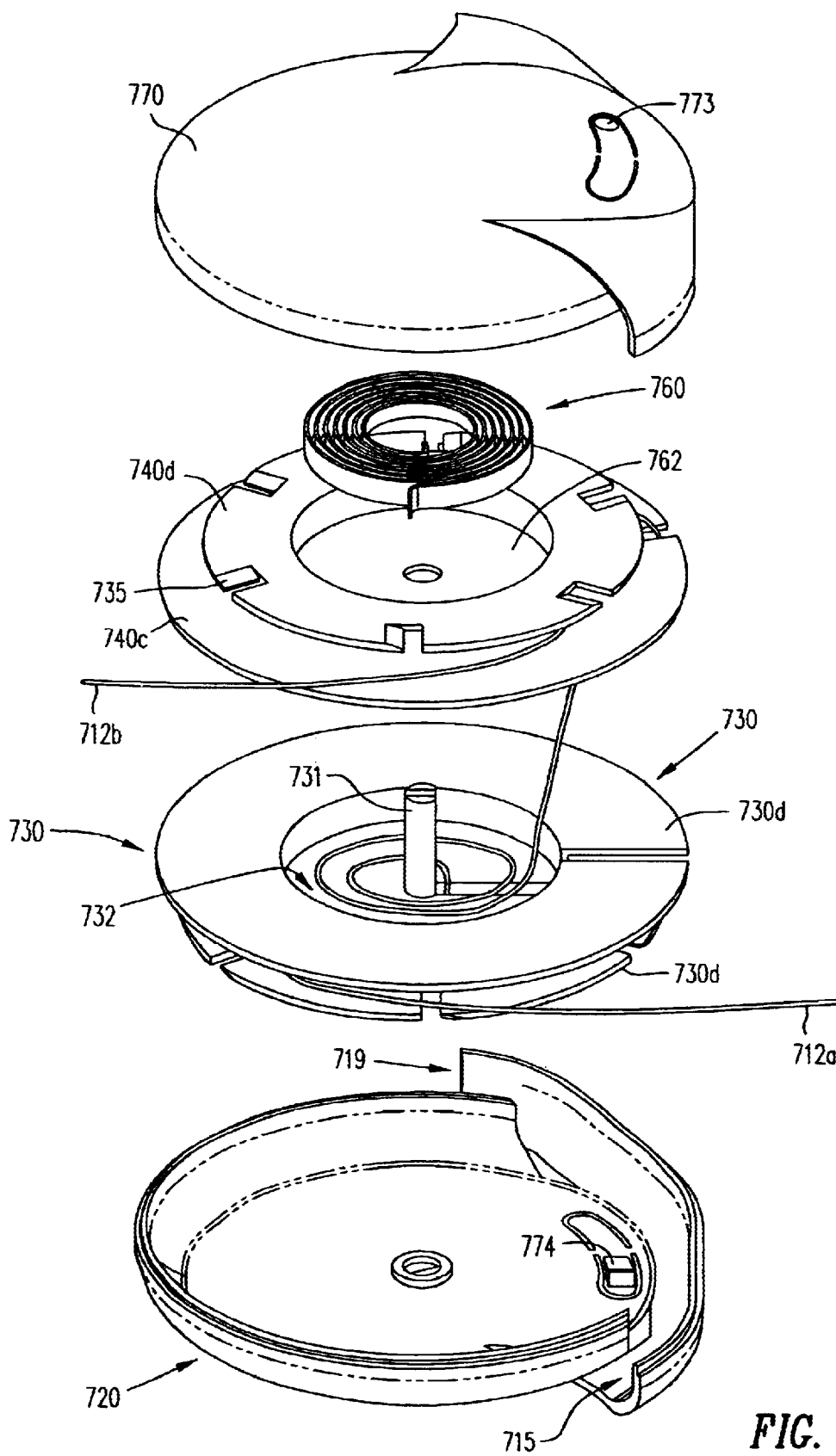
Figures 28A, 28B:
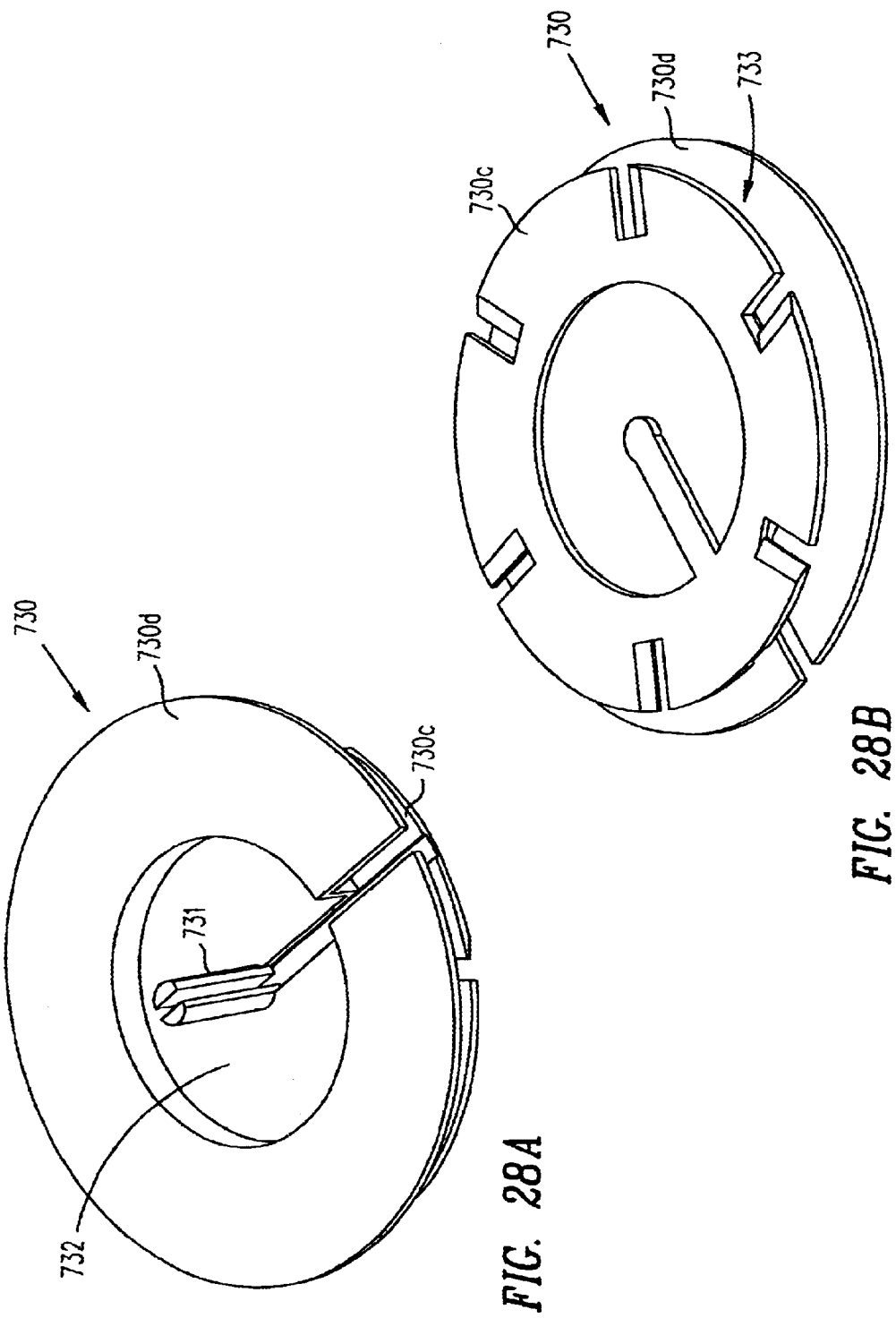
FIGS. 28A and 28B are top and bottom perspective views, respectively, of the bottom spool in the embodiment illustrated in FIGS. 25–27.
Figure 30:
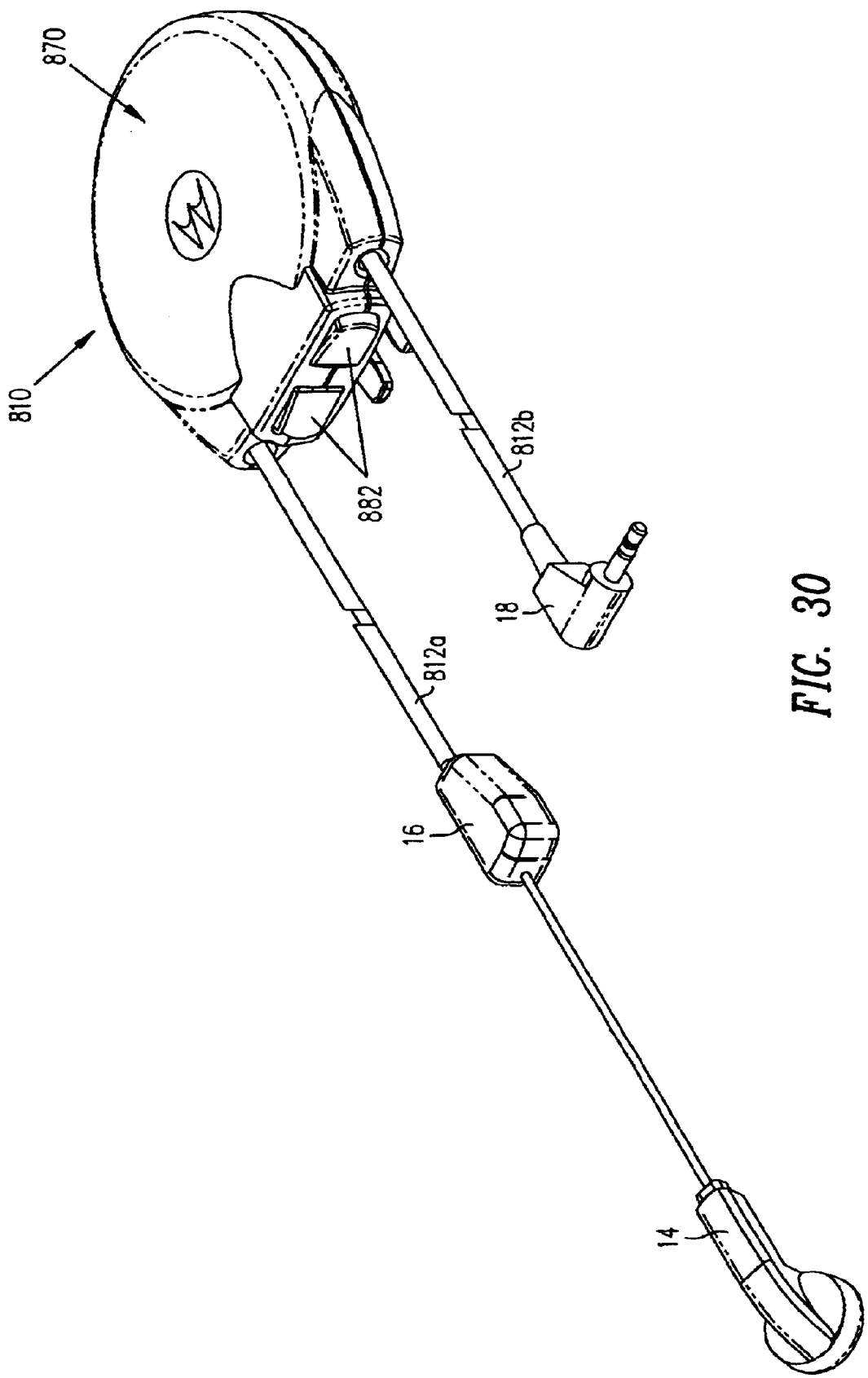
FIGS. 30, 31 and 32 are a perspective view, a cross sectional view and an exploded view, respectively, of the tenth and preferred embodiment of the present invention and similar to FIGS. 25, 26 and 27.
Figure 30A:
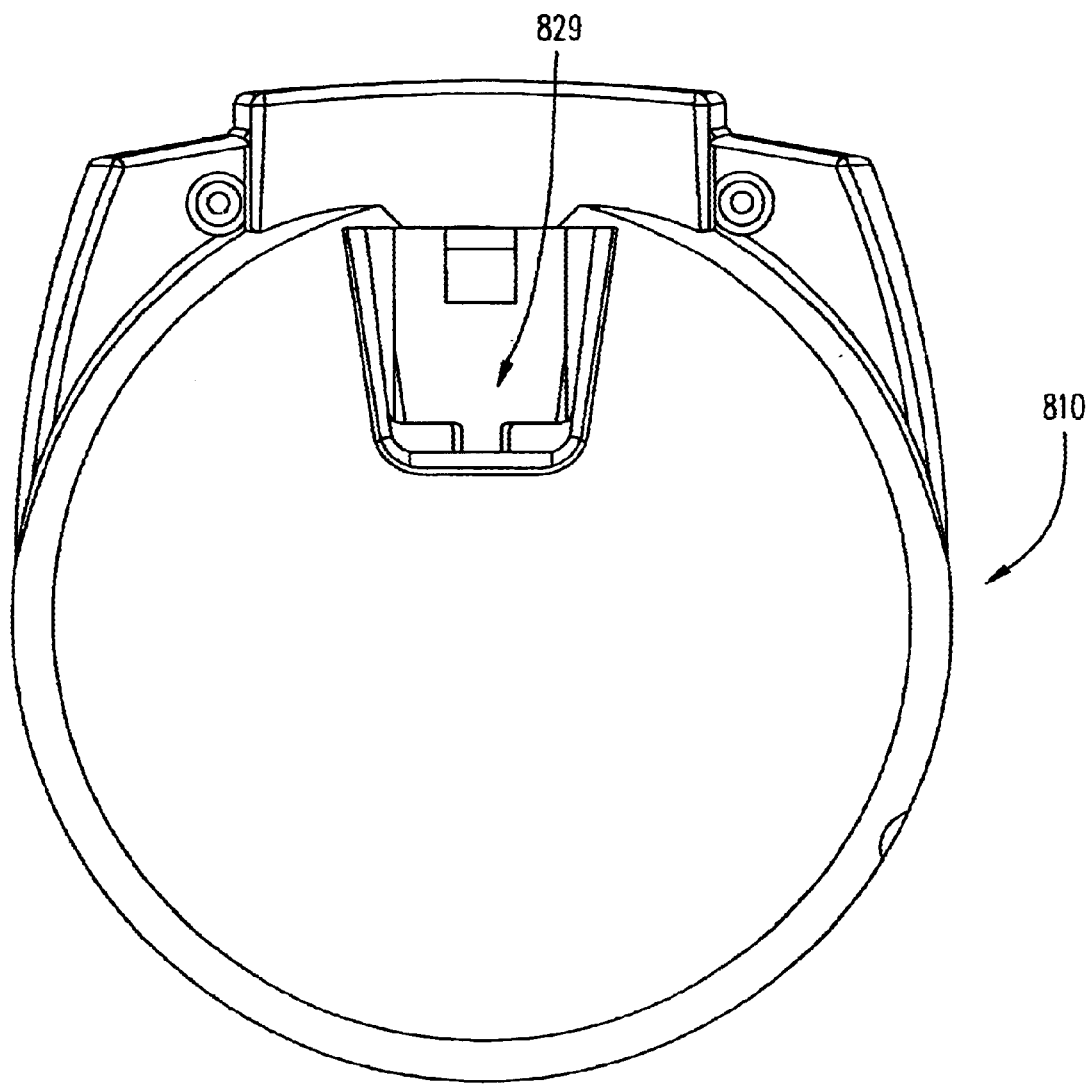
FIG. 30A is a bottom plane view of the structure shown in FIG. 30.
Figure 31:
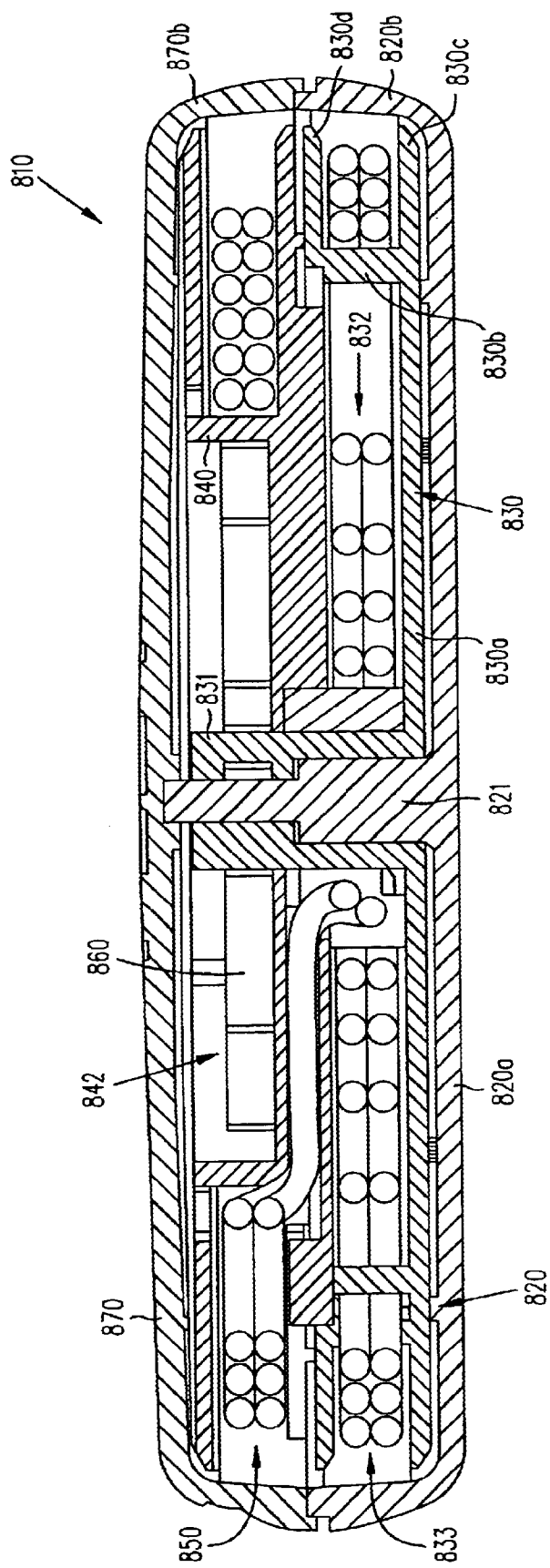

FIGS. 25–27 are views similar to FIGS. 1A, 4 and 5A but showing a ninth embodiment of the present invention which incorporates dual independent spools and a single spring. FIG. 25 shows a top view of the retractable cord device 708, the bottom view being a substantial mirror image of the top view.

Referring to FIGS. 26 and 27, the reversible rewind device 708 includes a housing 707 made up of a bottom shell 720 having a slightly upwardly curved bottom surface 720a with an outer upwardly extending circular peripheral flange 720b and a top shell 770 having a domed top surface 770a integrally connected to a circular peripheral flange portion 770b which mates with the flange portion 720b of the bottom shell.

A bottom spool 730 has a circular wall 730a connected to a hollow cylindrical bottom spool hub/spindle 731 seated within and extending between recesses centered in the bottom surface 720a of the bottom shell and in the top surface 770a of the top shell 770. Lower and upper flanges 730c and 730d extend outwardly from the cavity wall. 730b defining there between the earphone cord-winding cavity 733.

A top spool 740 is positioned above and centered with the bottom spool 730 and has a central flat wall 740a centrally apertured to rotate on the hub/spindle 731 of the bottom spool. In the middle of its central wall 740a, the top spool 740 has a upwardly and downwardly extending cavity wall 740b which defines below the bottom wall 740a the reversible winding chamber 732 and above the bottom wall 740a the spring cavity 762 where the spring 760 is housed with its inner end connected to the bottom spool hub/spindle 731 and its outer end connected to the top spool cavity wall 740b. The upper spool cavity wall 740b and lower and upper flanges 740c and 740d define a radially outwardly opening cavity 750 where the connector end portion 712b of the cord 712 is wound. An earphone end cord orifice 715 provides for extension and retraction of the earphone end cord portion 712a, and a connector end orifice 719 permits extension and retraction of the connector end portion 712b of the cord 712 with the cord portions 712a and 712b falling generally in the same plane as they are withdrawn and retracted into the housing 710.

One end of the middle portion 712c of the cord is connected at 712d where the cord passes into the core of the spindle hub 731 from the reversible winding chamber 732 and also at 712e where that cord passes into the cavity 733 where the earphone end cord portion is wound. The other end of the middle portion 712c of the cord 712 is fixed at 712f where the cord passes from the reversible winding cavity 732 to the cavity 750 where the connector end portion 712b is wound. The coiled length of the middle portion 712c of the cord in the reversible winding cavity 732 allows each of the spools 730 and 740 to be rotated independently. If bottom spool 730 is rotated one way or another by pulling out or retracting the cord, top spool 740 rotates with respect to the bottom spool and the outer housing. Likewise, if top spool 740 is rotated by either retracting or extracting the cord 712 it also rotates with respect to bottom spool 730 and the other housings. Because the cavity wall 740b of the top spool and the hub/spindle 731 of bottom spool 730 are connected together by the driving force of the power spring 760, only one spring is required. If either the cord on the top spool 740 or the cord on the bottom spool 730 is extracted, the spring 760 is wound, and the extraction energy is stored in the spring 760. As in the other designs, the latch flexures 775 and latch buttons 773 are used to release each of the respective spools if they are wound. Preventing the bottom and top spools 731 and 740, respectively, from unwinding relative to each other are the latches 774 on the inside surface of the bottom and to shells 720 and 770, respectively, or a fully retracted cord where the hardware at the end of the cord cannot be pulled further inside the housing 710.

The embodiment in FIGS. 25–29 enables independent retraction and extraction of either or both ends of the cord while maintaining a continuous cord internally.

Referring now to FIGS. 30–40, there is shown a tenth and preferred embodiment of the present invention which shows a retractable cord device having two spools and one spring very similar to the construction of the embodiment illustrated in FIGS. 25–29. Similar reference numbers are used in FIGS. 30–40 as in FIGS. 25–29, except for the first digit of the reference numbers in the latter figures is changed to a "8."

The significant differences between the ninth and tenth embodiments are the provision of a central spindle 821 projecting upwardly from the bottom surface 820a of the bottom shell 820 through the bottom spool hub 831 of the bottom spool 830. The bottom shell spindle 821 has a lower large diameter 821a and an upper smaller diameter 821b which slidably receive correspondingly dimensioned inner surfaces on the bottom, spool hub 831. In the tenth embodiment, the reversible winding chamber 832 is located in the same plan as and radially inward of the winding chamber 833 for the earphone end portion 812a of the cord 812.

The inner end of the spring 860 is connected to the upper end of the bottom spool hub 831, and the outer end of the spring 860 is connected to the cavity wall 840(b) of the top spool 840. One side of the bottom shell 820 and the top shell 870 are connected by snaps 828 and 878 shown in FIGS. 32, 33a and 37b. The bottom wall 830a of the bottom spool 830 includes a clip slot 822 formed by a clip flange 829a and a clip slot 829b best shown in FIG. 833b.

Figure 40:
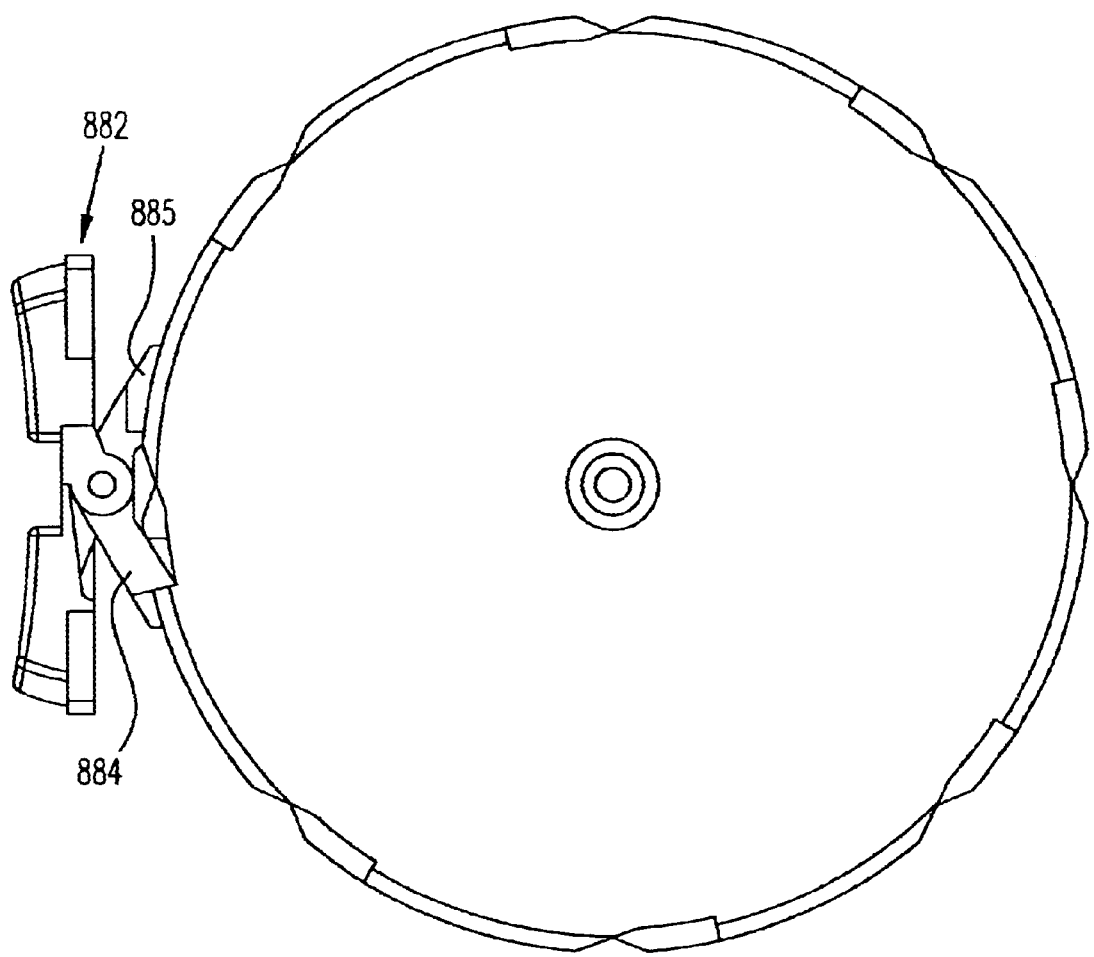
FIG. 40 is a top view of one spool showing the position of the, ratchet buttons for engagement with the ratchet teeth of the spools.

The bottom and top spools 830 and 840 are provided with ratchet teeth 830e which can be selectively engaged by a pair of ratchet buttons 882 which are spring bias mounted on a rocker pin 83 each with ratchet arms 84 directed in opposite directions for engaging the ratchet teeth 830e of the opposite rotating bottom and top spools 830 and 840, respective with each button 882 including a guide web 85 for slidably engaging a spool as shown in FIGS. 40.

The inner end of the earphone end portion 812a of the cord 812 passes through a cord slot 834 and is clamped in a strain relief cord clamp 834a in the outer periphery of the reversible winding chamber 832 in the bottom spool 830. A cord retainer 35 shown in FIGS. 32, 35A and 35B receives and clamps the inner most end of the middle portion 812c of the cord 812 in a cord retainer slot 835d between a central primary hub 835a which is positioned on the bottom spool hub 831 and a secondary hub 835b spaced outwardly from the primary hub 835a. The cord retainer 835 includes a cord retainer radial arm 836 that extends from the retainer primary hub 835a radially in a cable slot 835a in the radial arm 836 through a cable slot 841 into the inner periphery of the circular cavity 850 near the outer periphery of the top spool 840 where the connector end portion 812b of the cord is wound.

The operation of the retractable cord device of the tenth and preferred embodiment is very similar to that of the ninth embodiment where the spools rotate in opposite directions when the cords are withdrawn from the device and the ratchet arms 884 prevent rotation of the respective spools unless the rocker buttons 882 are depressed.

Figure 41:
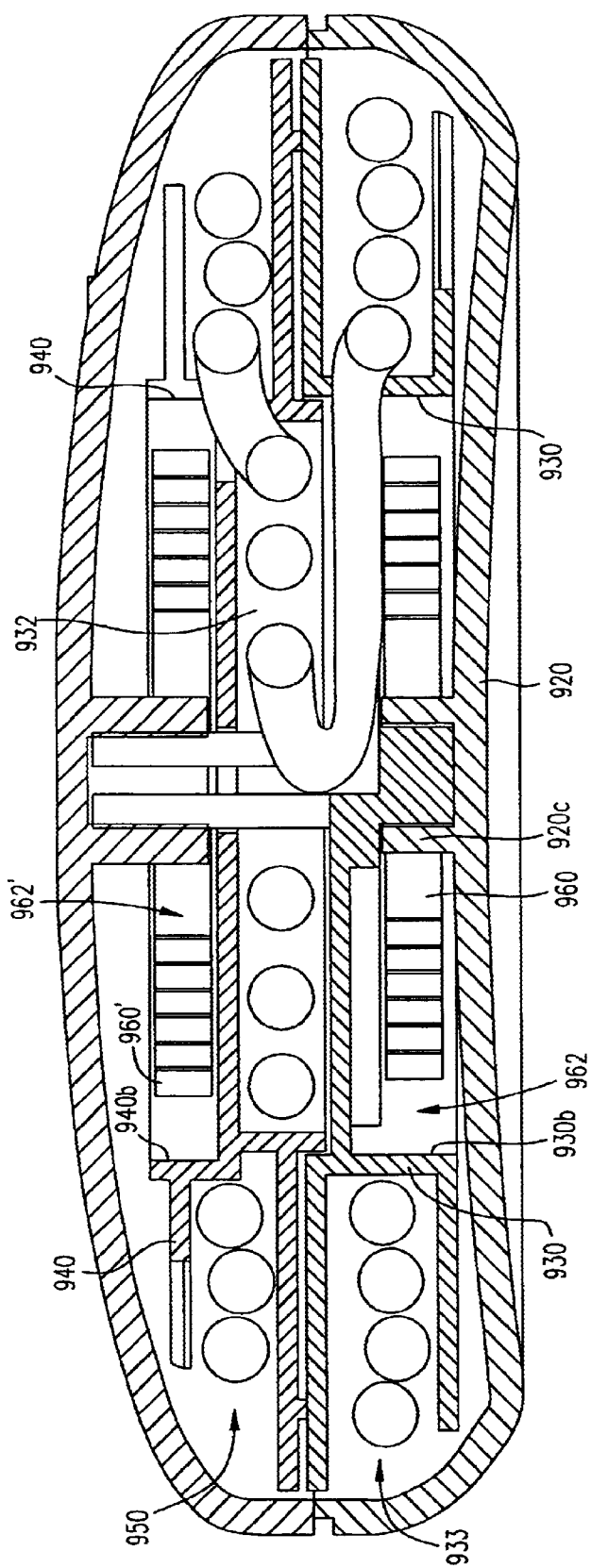
FIG. 41 is an elevational sectional view similar to FIG. 26 but illustrating an eleventh embodiment of the present invention.

Referring now to FIG. 41, there is shown an eleventh embodiment of the present invention very similar to the ninth embodiment of FIGS. 25–29 but having a separate power spring 960 and 960' for each of the two cable spools 930 and 940, respectively, instead of a single power spring.

The top spool 960' connects at its larger radius end to the inside wall 940b of the spring cavity 962' on the top of top spool 940. The small radius end of top spool spring 960' connects to the spindle on bottom spool 930. The larger radius outer end of the bottom spool spring 960 connects to the outer wall 930b of the spring cavity 962 on the underside of bottom spool 930. The small radius end of the bottom spool spring 960 connects to a journal 920c integral with the bottom shell 920. The bottom spool 930 also includes a channel on the bottom side for the cord to move from the spindle to the winding cavity 932 on the bottom spool side of the top spool 940. It should be noted that the top spool 940 and the bottom spool 930 can be configured so that the extraction and retraction of the cord ends can be in the same direction, or in opposite directions.

Figure 42:
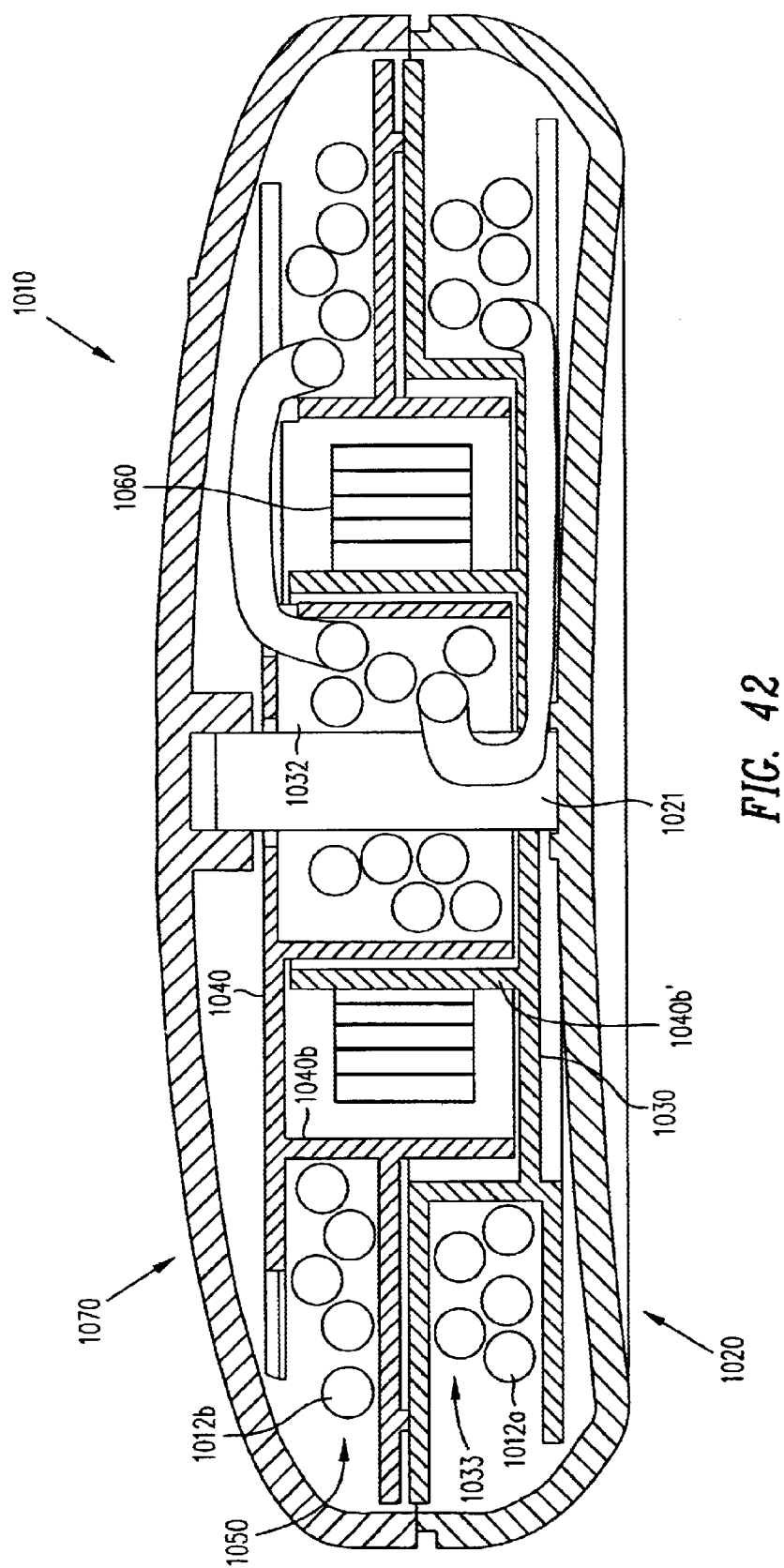
FIG. 42 is an elevational sectional view similar to FIG. 41 but illustrating an embodiment in which the spring is located in a cavity in between the radially inward reversible winding chamber and the radially outward wrapping cavities for the earphone end and connector end portions wound around separate spools.

FIG. 42 is an elevational sectional view similar to FIG. 41 but showing another version of a two-spool retractable device utilizing a single spring 1060 which is located radially in between the reversible winding chamber 1032 which immediately surrounds the central spindle and the outer cavity 1033 and 1050 where the earphone cord portion 1012a and the connector cord portion 1012b are respectively wound. The spring is attached at its large radius outer end to the inside of a top spool 1040 cavity wall 1040b. The center smaller radius end of the spring is attached to the wall 1040b' of the lower spool.

As each of the end portions of the earphone cord 1012a and the connector cord 1012b are extracted from or retracted into each of the winding cavities 1033 and 1050 respectively, the two spools can rotate with respect to one another because of the slack length of cord that is fixedly attached to reside in the center reversible winding chamber 1032. The cord 1012 is fixedly attached at both spots where it enters the reversible winding chamber 1032. As the two spools 1030 and 1040 rotate, the windings of the length of cord in the reversible winding chamber 1032 either wind up tighter or unwind, depending on the relative rotation of the top and bottom spools 1040 and 1030. It should be noted that the reversible winding chamber 1032 could be implemented so that the cord is constrained to wind and unwind in a single plane such as with a winding restraint plate like plate 37 shown in FIG. 5A with reference to the first embodiment.

Figure 43:
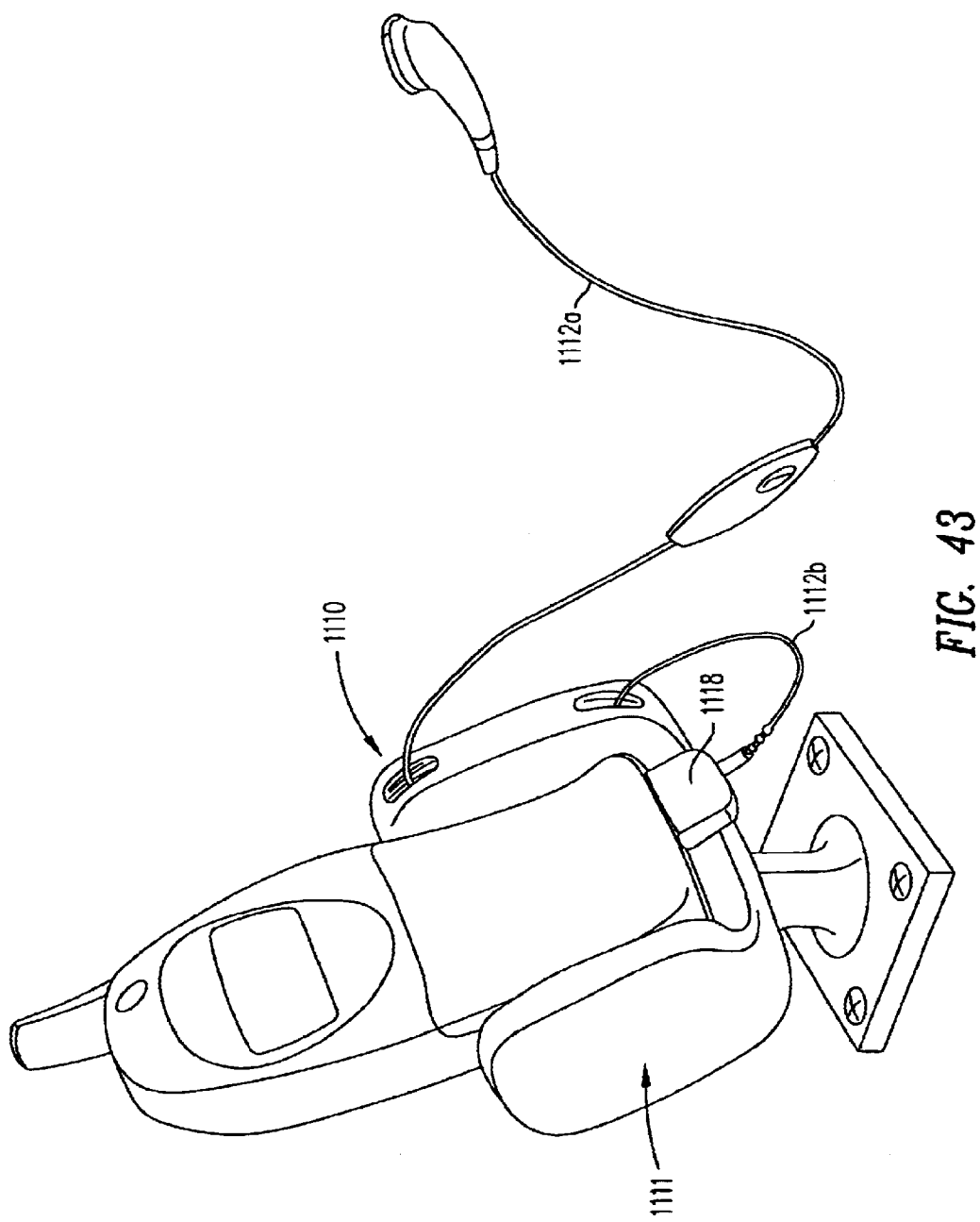
FIGS. 43 and 44 are perspective views showing how the retractable cord device of the present invention can be integrated into the cradle or dock of a cellular phone.

The retractable cord device of the present invention has many applications. As shown in FIG. 43, the cord retention device 1110 may be incorporated into a cradle or a dock 1111 that is made for a cellular phone. In this embodiment, a dual independent retraction design is incorporated into the cradle 1111. Before the cellular phone is snapped into the cradle the connector end 1118 of the cord is extracted a small amount and plugged into the cellular phone. Then the phone is snapped into the cradle 1112. The user would then extract the earphone/microphone end of the cord 1112a and don the earphone. If the user wanted to pull the phone off the cradle 1111, the connector end 1118 of the cord would also independently extract. Buttons on the side of the cradle 1111 would activate the retraction of either the earphone end 1112a or the connector end 1112b of the cord. This design can also incorporate a retraction mechanism where only the earphone/microphone end 1112a of the cord is extracted and retracted, as discussed above.

Figure 44:
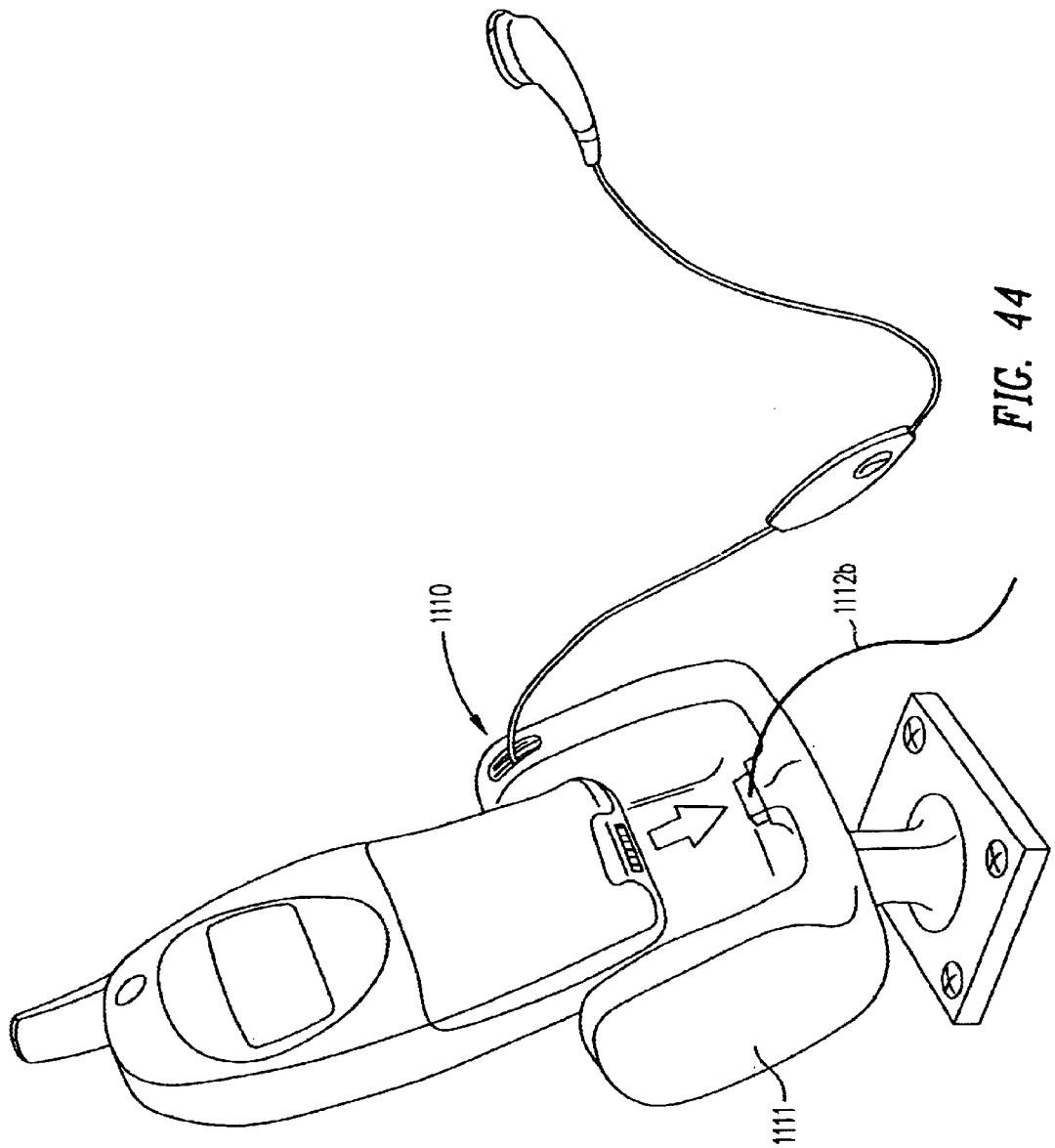

FIG. 44 shows how the connector end 1112b of the cord could be fixedly attached to the cradle 1111 so that the user would make the connection to the retractable earphone simply by plugging the phone into the cradle.

Figure 45B:
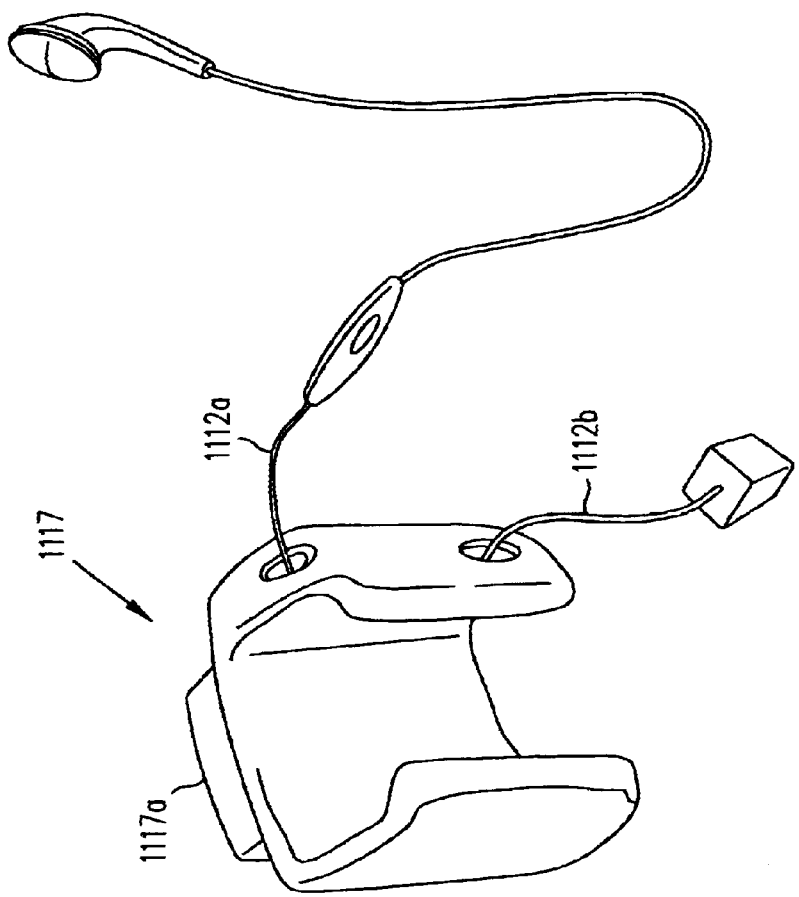
FIG. 45A is a side view and FIG. 45B is a perspective view showing how the retractable device can be integrated in a belt clip.
Figure 45A:
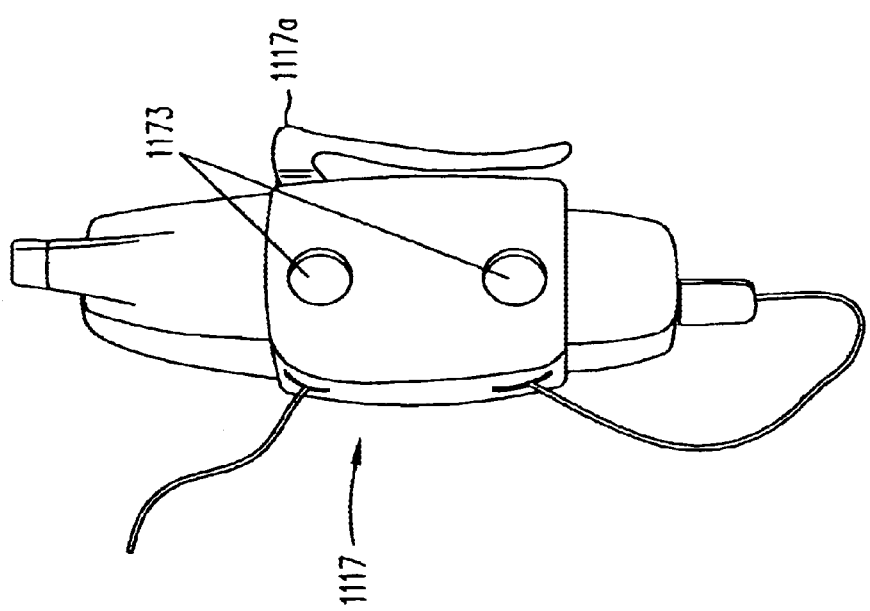
Figure 46:
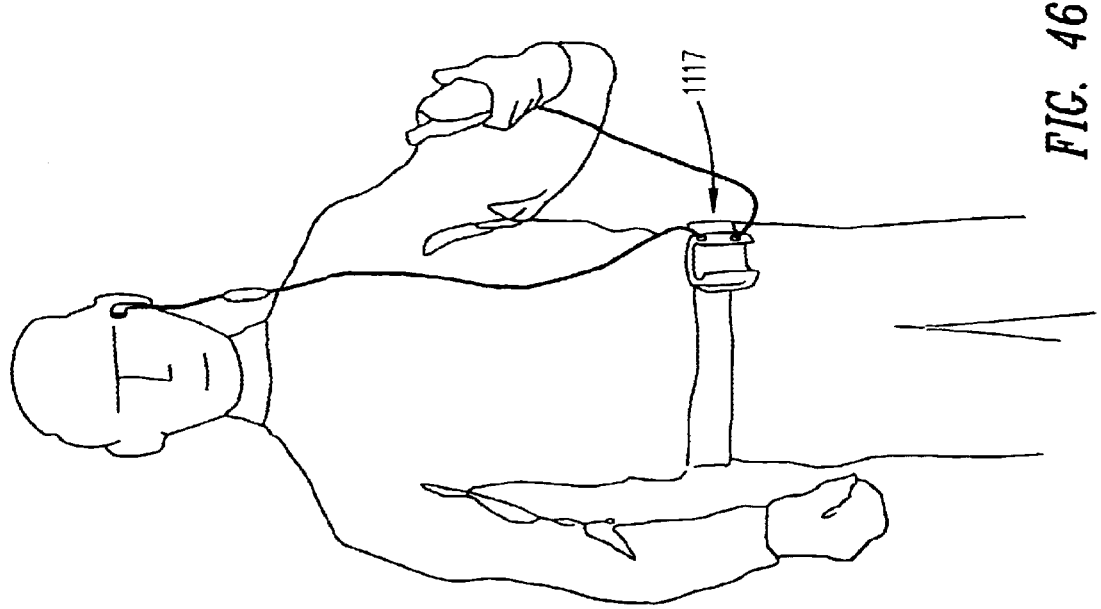

FIGS. 45A and 45B show how a retractable device can be integrated into a belt clip 1117 with a clip portion 1117a that is often used to wear a cellular phone. Both the connector end 1112b and the earphone end 1112a would retract and extract independently. FIG. 46 shows a person using such a belt clip 1117 with both ends extracted. FIG. 45A shows the location of two buttons 1173 that would activate the retraction of the individual cords.

Figure 47:
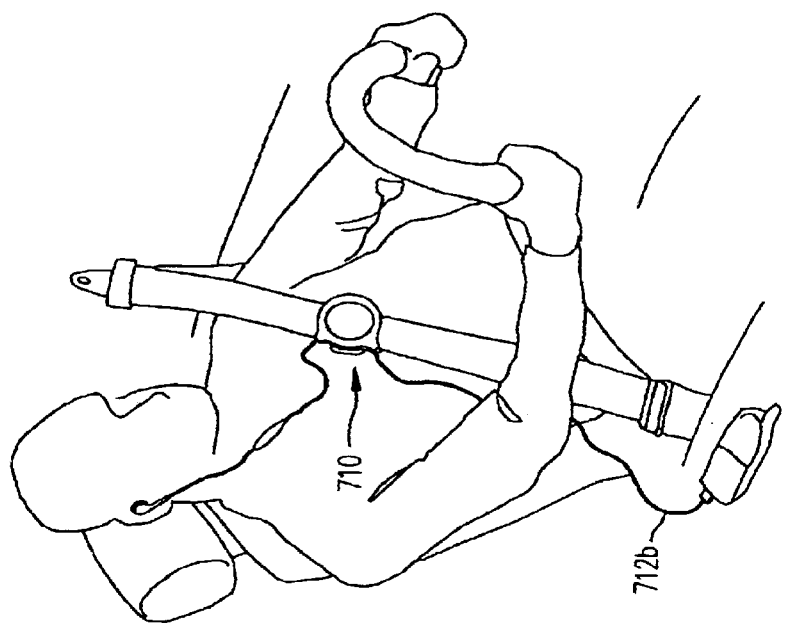
FIGS. 46 and 47 are perspective views showing how the retractable device is used with a belt clip and with an automobile safety belt, respectively.

FIG. 47 also shows how a person driving a car would use the device in accordance with the present invention such as the embodiment of FIG. 25 with the integrated belt clip 1117. The retractable housing 710 can be clipped onto the seat belt. When the user dons the seat belt, the connector end 712b is extracted and connected to the cell phone. The earphone end 712a is extracted and placed in the person's ear. When the user leaves the car, both ends are extracted and the retractable device can either stay on the seat belt when it is retracted, or the user can take the retractable earphone device with him.

FIG. 48 shows how the retractable cable device would be integrated into the cellular phone battery. In the embodiment of FIG. 48A both the connector and earphone retract independently. In the embodiment of FIG. 48B the connector is fixedly attached to the battery housing and mates with the respective connector on the phone when the battery is attached so that the device only retracts on the earphone end of the cable. There may be pass through connector if other signals, such as external antenna, are to be connected.

What is claimed is:

1. A retractable cord device, comprising:

a housing having an axis;

a cord having a first end portion, a second end portion and a middle portion;

a first winding spool rotatably mounted within said housing and rotatable about said axis, said first spool having a first peripheral cavity for winding said first end portion of said cord;

a spring urging said first spool to wind said first end portion of said cord in said first peripheral cavity;

said housing having a first opening for passage of said first end portion of said cord and a second opening for passage of said second end portion of said cord;

a reversible winding cavity located within the housing that contains said middle portion of said cord, wherein the cord first end portion has a length sufficiently large compared to that of said cord middle portion such that said middle portion of said cord is repositioned from a substantially clockwise wound state to a substantially counterclockwise wound state by rotation of the first winding spool as the first portion of the cord is wound in said first peripheral cavity;

means within said housing for fixing at least one point of said middle portion of said cord with respect to said housing or said first spool; and a spindle positioned within said housing and wherein said fixing means fixes said middle portion of said cord to said spindle.

2. A retractable earphone cord device comprising:

a housing having an axis;

a continuous earphone cord having a first portion terminating in an earphone, a second portion terminating in a cord connector, and a middle portion therebetween;

a first winding spool rotatably mounted within said housing and rotatable about said housing axis to wind the first portion of said cord in an annular peripheral cavity of said first spool;

a spring urging said first winding spool to wind said first portion of said cord in the peripheral cavity of said first spool;

said housing including a first opening for passing said first portion of said cord out of said housing;

a reversible winding cavity located within said housing for housing said middle portion of said cord;

means for fixing opposite ends of said middle portion of said cord at two points within said housing, wherein the cord first portion has a length sufficiently large compared to that of said cord middle portion so that said middle portion is coiled in opposite directions within said reversible cavity responsive to rotation of said first spool without said middle portion of said cord leaving said reversible winding cavity;

wherein said spring and said reversible winding cavity lie in parallel planes.

3. A retractable earphone cord device comprising:

a housing having an axis;

a continuous earphone cord having a first portion terminating in an earphone, a second portion terminating in a cord connector, and a middle portion therebetween;

a first winding spool rotatably mounted within said housing and rotatable about said housing axis to wind the first portion of said cord in an annular peripheral cavity of said first spool;

a spring urging said first winding spool to wind said first portion of said cord in the peripheral cavity of said first spool;

said housing including a first opening for passing said first portion of said cord out of said housing;

a reversible winding cavity located within said housing for housing said middle portion of said cord;

means for fixing opposite ends of said middle portion of said cord at two points within said housing, wherein the cord first portion has a length sufficiently large compared to that of said cord middle portion so that said middle portion is coiled in opposite directions within said reversible cavity responsive to rotation of said first spool without said middle portion of said cord leaving said reversible winding cavity; and a constraint plate holding the middle portion of said cord in a single plane in said reversible winding cavity.

* * * * *